(12) United States Patent
Saitou et al.

(10) Patent No.: US 8,531,575 B2
(45) Date of Patent: Sep. 10, 2013

(54) IMAGE PRODUCTION DEVICE, IMAGE PRODUCTION METHOD, AND PROGRAM FOR DRIVING COMPUTER TO EXECUTE IMAGE PRODUCTION METHOD

(75) Inventors: Yuji Saitou, Tokyo (JP); Mitsuo Okumura, Tokyo (JP); Tatsuhito Tabuchi, Tokyo (JP); Takeshi Harada, Tokyo (JP); Masahiro Takahashi, Kanagawa (JP)

(73) Assignee: Sony Corporation (JP)

( * ) Notice: Subject to any disclaimer, the term of this patent is extended or adjusted under 35 U.S.C. 154(b) by 202 days.

(21) Appl. No.: 12/946,005

(22) Filed: Nov. 15, 2010

(65) Prior Publication Data

US 2011/0058086 A1 Mar. 10, 2011

Related U.S. Application Data

(62) Division of application No. 11/395,618, filed on Mar. 31, 2006, now abandoned.

(30) Foreign Application Priority Data

Apr. 1, 2005 (JP) .................. 2005-106950

(51) Int. Cl.
*H04N 5/222* (2006.01)
*H04N 5/76* (2006.01)
(52) U.S. Cl.
USPC ............... 348/333.02; 348/231.2; 348/231.3; 348/231.4; 348/231.5; 348/333.01
(58) Field of Classification Search
USPC ............... 348/231.1–231.99, 333.01, 333.02
See application file for complete search history.

(56) References Cited

U.S. PATENT DOCUMENTS

| | | | |
|---|---|---|---|
| 5,608,715 A | 3/1997 | Yokogawa et al. | |
| 5,974,386 A * | 10/1999 | Ejima et al. | 704/276 |
| 7,986,819 B2 * | 7/2011 | Momosaki | 382/118 |
| 2005/0262527 A1 * | 11/2005 | Yuzawa et al. | 725/10 |
| 2007/0189138 A1 | 8/2007 | Kuroda et al. | |

FOREIGN PATENT DOCUMENTS

| | | | |
|---|---|---|---|
| JP | 58-149584 A | 9/1983 | |
| JP | 11-069266 A | 3/1999 | |
| JP | 11-328209 A | 11/1999 | |
| JP | 2001-069456 A | 3/2001 | |

(Continued)

*Primary Examiner* — Tuan Ho
*Assistant Examiner* — Peter Chon
(74) *Attorney, Agent, or Firm* — Lerner, David, Littenberg, Krumholz & Mentlik, LLP

(57) ABSTRACT

The total imaging time period and recorded volume of each image is displayed in association with the imaging date and time of the image. An imaging information acquiring section acquires information on the imaging dates and times and recorded volumes of images. The acquired information is held in an index table. A period setting part sets the period of a period display. An imaging start position deciding section decides the position corresponding to the imaging start date and time of each image in the period display. An imaging time length deciding section decides the display range of the imaging time length of each image in the period display. A recorded volume length deciding section decides the display range of the recorded volume length of each image. Based on these decision results, an imaging position display creating section creates an imaging position display in which the imaging start positions of the images and the imaging time lengths or the recorded volumes of the images are displayed relative to the period display.

14 Claims, 20 Drawing Sheets

(56) References Cited

FOREIGN PATENT DOCUMENTS

| JP | 2001-075701 A | 3/2001 |
| JP | 2001-134578 A | 5/2001 |
| JP | 2003-099434 A | 4/2003 |
| JP | 2003-228587 A | 8/2003 |
| JP | 2003-281864 A | 10/2003 |
| JP | 2004-328265 A | 11/2004 |

* cited by examiner

| FILE NAME | IDENTIFICATION FLAG | IMAGING START DATE AND TIME | IMAGING TIME LENGTH | FILE SIZE |
|---|---|---|---|---|
| MOVIE01 | ○ | 2005:01:01:10:50:23 | 6:21 | 5.1M |
| MOVIE02 | ○ | 2005:01:01:11:14:10 | 5:15 | 1.9M |
| IMG01 | × | 2005:01:01:11:26:01 | 0 | 5462K |
| MOVIE03 | ○ | 2005:01:01:11:36:19 | 4:01 | 1.5M |
| MOVIE04 | ○ | 2005:01:01:12:01:47 | 41:13 | 36.2M |
| IMG02 | × | 2005:01:01:12:50:59 | 0 | 6543K |
| ⋮ | ⋮ | ⋮ | ⋮ | ⋮ |

FIG.8

| SELECTIVE AREA | CORRESPONDING AREA | CORRESPONDING THUMBNAIL |
|---|---|---|
| 1 | SELECTIVE AREA#1 {(X1,Y1),(X2,Y2)} | THUMBNAIL#1~6 (IMG1.jpg~IMG6.jpg) |
| 2 | SELECTIVE AREA#2 {(X3,Y3),(X4,Y4)} | THUMBNAIL#7~11 (IMG7.jpg~IMG11.jpg) |
| 3 | SELECTIVE AREA#3 {(X5,Y5),(X6,Y6)} | THUMBNAIL#12~13 (IMG12.jpg~IMG13.jpg) |

FIG.12

| 538 | | |
|---|---|---|
| ARI_PCK | ADDITIONAL RECORDED INFORMATION IDENTIFIER | |
| | ARI_DAT_ID | ADDITIONAL RECORDED INFORMATION DATA IDENTIFIER |
| | ARI_DAT_VER | ADDITIONAL RECORDED INFORMATION VERSION |
| | APPLICATION INFORMATION | |
| | VND_NAME | VENDOR NAME |
| | PRD_NAME | PRODUCT NAME |
| | ⋮ | ⋮ |
| | RECORDING TIME INFORMATION | |
| | VOBU_LCL_TM_ZOME | TIME ZONE IN ARI_DATA RECORDING |
| | VOBU_REC_TM | ARI_DATA RECORDING TIME |
| | CAMERA INFORMATION | |
| | F_NUM | F NUMBER |
| | EXP_TM | EXPOSURE TIME |
| | ⋮ | ⋮ |

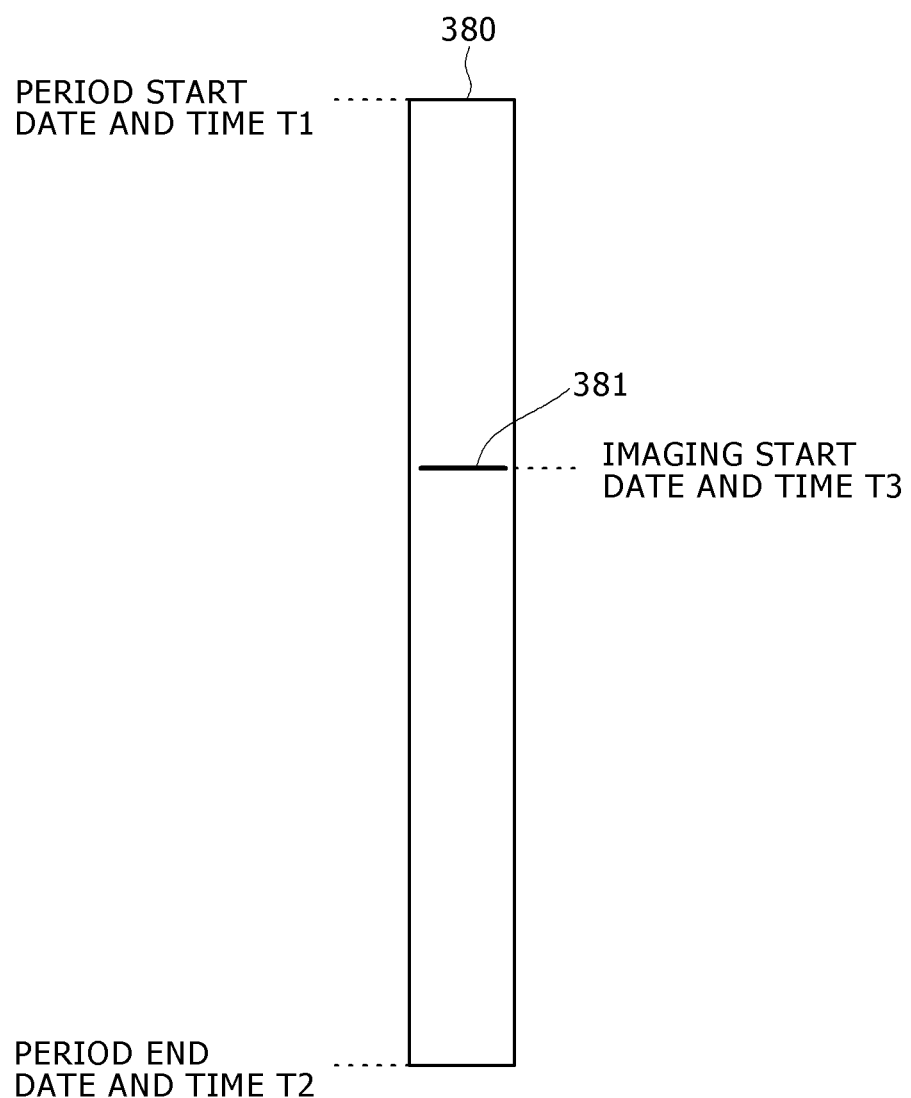

IMAGE PRODUCTION DEVICE, IMAGE PRODUCTION METHOD, AND PROGRAM FOR DRIVING COMPUTER TO EXECUTE IMAGE PRODUCTION METHOD

CROSS-REFERENCE TO RELATED APPLICATIONS

This application is divisional of U.S. application Ser. No. 11/395,618, filed on Mar. 31, 2006, which claims priority from Japanese Patent Application No. JP 2005-106950 filed on Apr. 1, 2005, the disclosures of which are hereby incorporated by reference herein.

BACKGROUND OF THE INVENTION

The present invention relates to an image production device that allows display of the imaging date and time, recording time period and so forth of images in association with a period display that represents a certain period. The present invention also relates to a processing method in the device, and a program for driving a computer to execute the method.

In recent years, in addition to conventional video cameras using detachable videotapes, video cameras that record moving images in media such as a DVD and hard disk have been spreading. These media permit random access thereto unlike conventional videotape media. In a video camera using a videotape, reproduction of an intended scene frequently requires fast-forwarding and fast-rewinding, and therefore it takes a long time period to watch the intended scene. On the contrary, in a video camera that employs a randomly-accessible medium, contents can be reproduced without fast-forwarding and fast-rewinding, which are required in conventional video cameras using videotapes.

Furthermore, videotape-type cameras do not have an index that displays contents of moving images. In contrast, video cameras employing a randomly-accessible medium typically have an index using thumbnails, which offers convenience for selecting a scene to be reproduced. In an index of moving images recorded in a randomly-accessible memory, as many thumbnails as there are scenes or files are displayed as representative pictures of the moving images, e.g., by six pictures per one page. A technique is proposed in which screen display is switched upon selection of a thumbnail, and information on the recording date and time, recording time period and so forth of the still or moving image corresponding to the selected thumbnail is represented, and in reproduction of a moving image, information on how long time has passed since the scene had been reproduced before is represented (refer to e.g. Japanese Patent Laid-open No. 2001-69456, shown in FIG. 14).

However, in this conventional technique, the total imaging time period and recorded volume per each scene cannot be found. In addition, the frequency and date-and-time transition of imaging cannot be found. In particular, in order to find the imaging time period of one scene, the scene needs to be reproduced until the last of the scene. Moreover, there is no way of finding the frequency and date-and-time transition of recording.

Therefore, it is desirable, in the present invention, to display the total imaging time period and recorded volume of each image in association with the imaging date and time of the image.

SUMMARY OF THE INVENTION

The present invention is made in order to solve the above-described problem. According to a first embodiment of the invention, there is provided an image production device including an imaging date-and-time acquiring section that acquires an imaging date and time of a certain image from a recording medium; an imaging position deciding section that decides a position corresponding to the imaging date and time as an imaging position in a period display representing a certain period; and an imaging position display creating section that creates an imaging position display in which the imaging position is superimposed on the period display. The first embodiment offers an advantage of indicating the position corresponding to the imaging date and time of an image in a certain period relatively in an imaging position display. The imaging date and time of an image encompasses the imaging start date and time of the image and the imaging end date and time of the image.

According to a second embodiment of the invention, there is provided an image production device including an imaging date-and-time acquiring section that acquires an imaging date and time of a certain image from a recording medium; an imaging start date-and-time creating section that creates an imaging start date and time of the certain image based on the imaging date and time; an imaging start position deciding section that decides a position corresponding to the imaging start date and time as an imaging start position in a period display representing a certain period; and an imaging position display creating section that creates an imaging position display in which the imaging start position is displayed relative to the period display along at least one axial direction of a two dimensional representation. The second embodiment offers advantages of two-dimensionally representing an imaging position display, and indicating the position corresponding to the imaging date and time of an image in a certain period relatively in the imaging position display.

According to a third embodiment of the invention, there is provided an image production device including an imaging date-and-time acquiring section that acquires an imaging date and time of a certain image from a recording medium; a number-of-imaging length deciding section that decides, as a number-of-imaging length, a length corresponding to the number of times of imaging of an image per a unit period in a certain period based on the imaging date and time of the image; and an imaging frequency display creating section that creates an imaging frequency display in which the number-of-imaging length is time-sequentially displayed. The third embodiment offers an advantage of indicating the number of imaging of an image in each unit period.

According to a fourth embodiment of the invention, there is provided a display device including an imaging date-and-time acquiring section that acquires an imaging date and time of a certain image from a recording medium; an imaging position deciding section that decides a position corresponding to the imaging date and time as an imaging position in a period display representing a certain period; and an imaging position displaying section that displays the period display and the imaging position so that the imaging position is superimposed on the period display. The fourth embodiment offers an advantage of indicating the position corresponding to the imaging date and time of an image in a certain period relatively in an imaging position display.

According to a fifth embodiment of the invention, there is provided an image production method including acquiring an imaging date and time of a certain image from a recording medium; deciding a position corresponding to the imaging date and time as an imaging position in a period display representing a certain period; and creating an imaging position display in which the imaging position is superimposed on the period display. The fifth embodiment offers an advantage of indicating the position corresponding to the imaging date and time of an image in a certain period relatively in an imaging position display.

According to a sixth embodiment of the invention, there is provided an image production method including acquiring an imaging date and time of a certain image from a recording medium; creating an imaging start date and time of the certain image based on the imaging date and time; deciding a position corresponding to the imaging start date and time as an imaging start position in a period display representing a certain period; and creating an imaging position display in which the imaging start position is displayed relative to the period display along at least one axial direction of a two dimensional representation. The sixth embodiment offers advantages of two-dimensionally representing an imaging position display, and indicating the position corresponding to the imaging date and time of an image in a certain period relatively in the imaging position display.

According to a seventh embodiment of the invention, there is provided an image production method including acquiring an imaging date and time of a certain image from a recording medium; deciding, as a number-of-imaging length, a length corresponding to the number of times of imaging of an image per a unit period in a certain period based on the imaging date and time of the image; and creating an imaging frequency display in which the number-of-imaging length is time-sequentially displayed. The seventh embodiment offers an advantage of indicating the number of imaging of an image in each unit period.

The embodiments of the present invention can provide an excellent advantage of displaying the total imaging time period and recorded volume of each image in association with the imaging date and time of the image.

BRIEF DESCRIPTION OF THE DRAWINGS

FIG. 8 illustrates one example of a selective area correspondence table according to the embodiment;

FIG. 12 is a diagram showing the data configuration of an additional recorded information pack (ARI_PCK) according to the embodiment;

FIG. 13 is a diagram showing the relationship between a period display and a certain imaging start position display according to the embodiment;

DETAILED DESCRIPTION

An embodiment of the present invention will be described in detail below with reference to the accompanying drawings.

Figure 1:
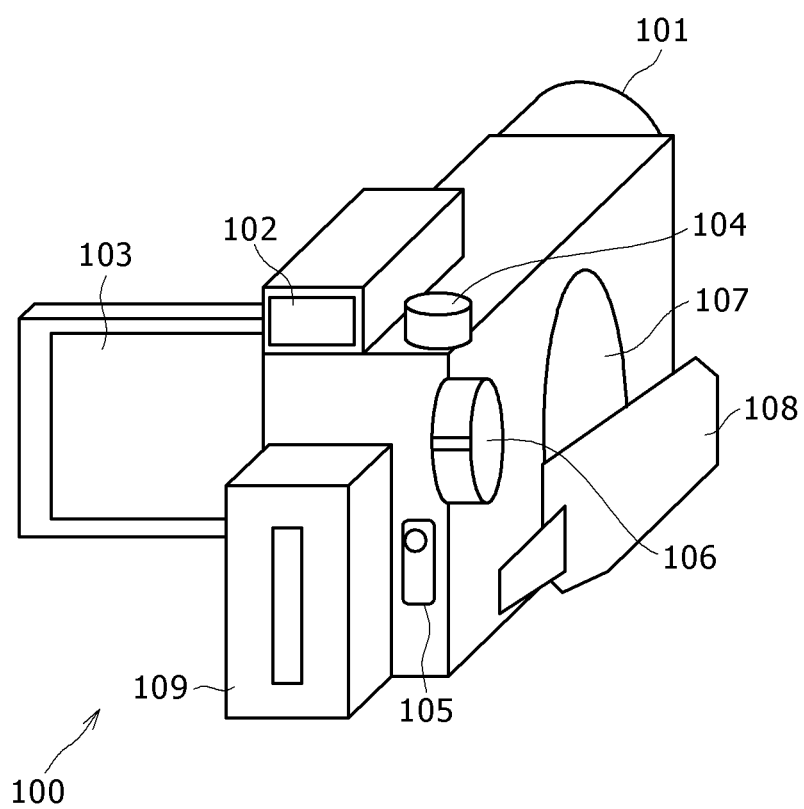
FIG. 1 illustrates one example of the external appearance of an image production device according to one embodiment of the present invention.

FIG. 1 illustrates one example of the external appearance of an image production device 100 according to one embodiment of the invention. The image production device 100 includes a lens unit 101, a view finder 102, a display unit 103, a still-image imaging button 104, a moving-image imaging button 105, a power supply switch 106, a recording medium holder 107, a grasp assisting member 108, and a buttery unit 109.

The lens unit 101 functions to form the image of a target object on an imaging element such as a charge coupled device (CCD). A user looks a target object through the view finder 102 in imaging thereof. The view finder 102 may be based on either system of optical and electronic systems. The display unit 103 displays thereon the image of a target object captured through the lens unit 101, and displays thereon image data in reproduction of the image data. A display unit in such an image production device is frequently provided with a touch-panel operation function that allows a user to push the screen surface of the display unit with a finger or the like to thereby operate the image production device. Also in the embodiment of the invention, the display unit 103 may be provided with a touch-panel operation function. The display unit 103 is formed of a liquid crystal display (LCD) for example. Alternatively, it may be formed of an organic electroluminescence (EL) display.

The still-image imaging button 104 is a button that is pushed down in imaging of a still image. The moving-image imaging button 105 is a button that is pushed down in the imaging of a moving image. The power supply switch 106 is a switch for starting the image production device 100 of the embodiment of the invention. The recording medium holder 107 holds therein a recording medium such as a DVD disk. The grasp assisting member 108 is a member that assists a user to grasp the image production device 100 of the embodiment of the present invention. The battery unit 109 supplies power to the image production device 100 of the embodiment of the present invention.

Figure 2:
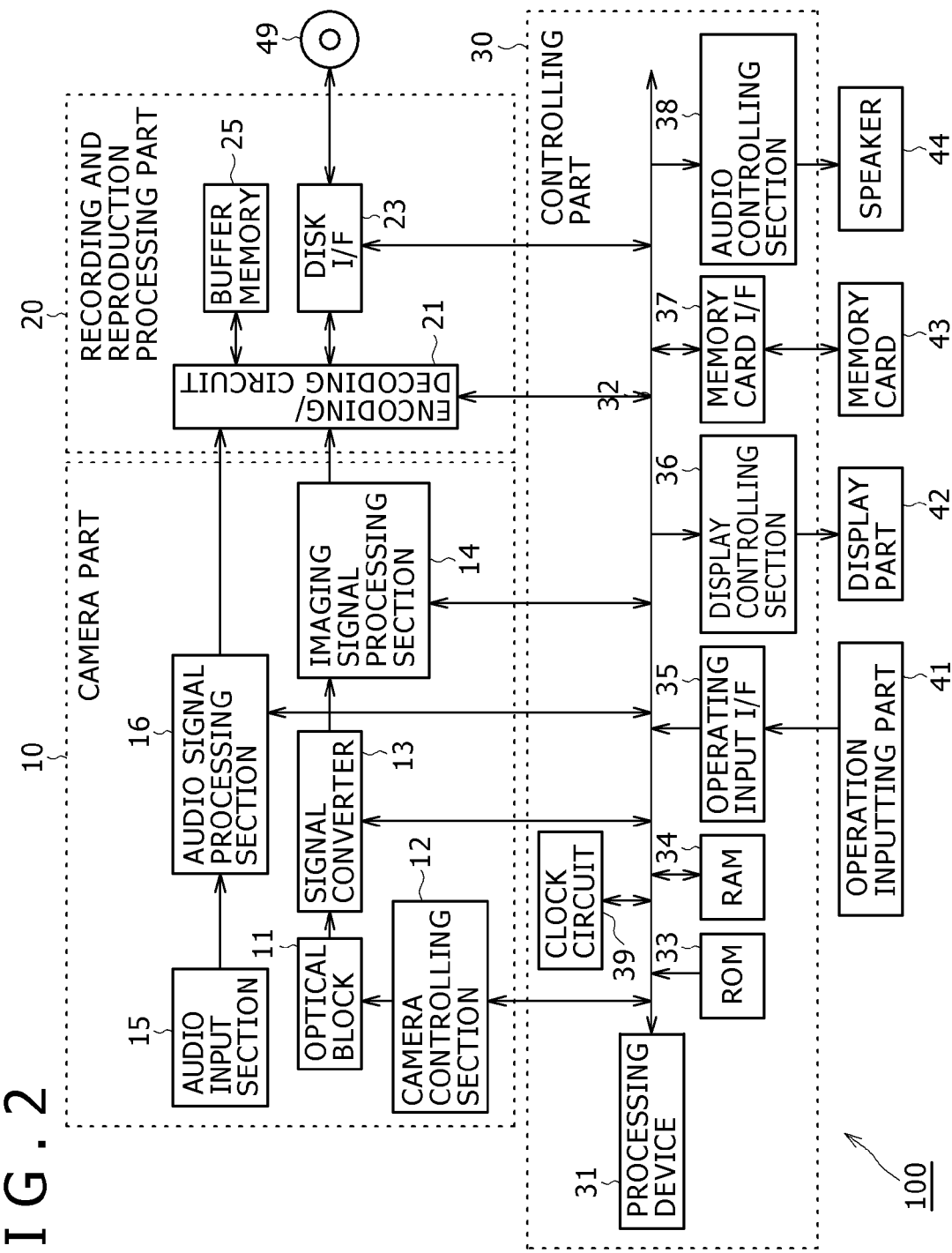
FIG. 2 illustrates one configuration example of the image production device according to the embodiment.

FIG. 2 illustrates one configuration example of the image production device 100 of the embodiment of the present invention. The image production device 100 includes a camera part 10, a recording and reproduction processing part 20 and a control part 30.

The camera part 10 includes an optical block 11, a camera controlling section 12, a signal converter 13, an imaging signal processing section 14, an audio input section 15, and an audio signal processing section 16. The optical block 11 incorporates therein a lens group for capturing the image of a target object, an aperture adjustment mechanism, a focus adjustment mechanism, a zoom mechanism, a shutter mechanism, a flush mechanism, a camera-shake correction mechanism and so on. The camera controlling section 12 generates a control signal to be supplied to the optical block 11 upon receipt of a control signal from the control part 30. The generated control signal is supplied to the optical block to thereby implement zoom control, shutter control, exposure control and so forth.

The signal converter 13 is constructed of an imaging element such as a CCD. On the image formation plane thereof, an image captured through the optical block 11 is formed. The signal converter 13 receives an image pick-up timing signal that is supplied from the control part 30 in response to shutter operation. Upon the receipt, the signal converter 13 converts the target object image formed on the image formation plane into an imaging signal, and supplies the imaging signal to the imaging signal processing section 14.

The imaging signal processing section 14 implements processing of gamma correction, auto gain control (AGC) and so on for the imaging signal based on a control signal from the control part 30, and also implements processing of conversion of the imaging signal into an image signal as a digital signal. The audio input section 15 collects audio sounds around the target object at the time of the imaging. An audio signal is supplied from the audio input section 15 to the audio signal processing section 16. The audio signal processing section 16 implements processing of correction, AGC and so on for the audio signal based on a control signal from the control part 30, and also implements processing of conversion of the audio signal into a digital signal.

The recording and reproduction processing part 20 includes an encoding/decoding circuit 21, a disk interface 23 and a buffer memory 25.

The encoding/decoding circuit 21 has an encode function of encoding and multiplexing an image signal, an audio signal and so forth from the camera part 10 to thereby convert the signals into compressed data. In addition, the encoding/decoding circuit 21 also has a decoding function of separating an image signal, an audio signal and so forth from compressed data and decoding the separated signals. Furthermore, the encoding/decoding circuit 21 implements automatic white balance control, exposure correction control, enlargement control in accordance with a digital zoom magnification, and so on, for an image signal from the imaging signal processing section 14 based on a control signal from the control part 30.

The disk interface 23 receives compressed data from the encoding/decoding circuit 21 and writes the data in a disk 49. In addition, the disk interface 23 retrieves compressed data from the disk 49, and supplies the data to the encoding/decoding circuit 21. The buffer memory 25 is composed of SDRAM for example, and is utilized as a work area for encoding and decoding by the encoding/decoding circuit 21.

The control part 30 includes a processing device 31, read only memory (ROM) 33, random access memory (RAM) 34, an operation input interface 35 coupled to an operating inputting part 41, and a display controlling section 36 coupled to a display part 42. The control part 30 also includes a memory card interface 37 for loading of a memory card 43, an audio controlling section 38 coupled to a speaker 44, a clock circuit 39 for recording of imaging time, and a system bus 32 that interconnect these components.

The processing device 31 controls processing of the entire control part 30, and uses the RAM 34 as a work area. Written to the ROM 33 are a program for controlling the camera part 10, and a program for executing control of recording and reproduction of an image signal and an audio signal.

A plurality of keys are provided in the operating inputting part 41 coupled to the operation input interface 35. The example of keys are a mode switch key for switching between an imaging mode and other modes such as a reproduction mode, a zoom adjustment key, an exposure adjustment key, a shutter key, a moving-image imaging key, a key for display adjustment for the display part 42, and other keys. The operation input interface 35 transmits an operation signal from the operating inputting part 41 to the processing device 31. The processing device 31 determines which key in the operating inputting part 41 is operated, and executes control processing according to the determination result.

The display part 42 coupled to the display controlling section 36 is constructed of e.g. an LCD, and displays an image corresponding to an image signal from the camera part 10 or an image signal retrieved from the disk 49, under control by the processing device 31. The display part 42 takes part of the function of the display unit 103 of FIG. 1.

The memory card interface 37 writes compressed data from the encoding/decoding circuit 21 in the memory card 43. In addition, the memory card interface 37 retrieves compressed data from the memory card 43, and supplies the data to the encoding/decoding circuit 21. The clock circuit 39 creates time information that represents a year, month, date, hour, minute, second and so forth.

The speaker 44 coupled to the audio controlling section 38 reproduces an audio sound corresponding to an audio signal from the camera part 10 or an audio signal retrieved from the disk 49, under control by the processing device 31.

Figure 3A:
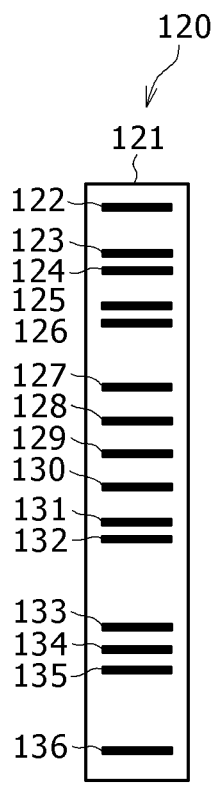
FIGS. 3A to 3C illustrate configuration examples of an imaging position display that is displayed in the image production device according to the embodiment.
Figure 3B:
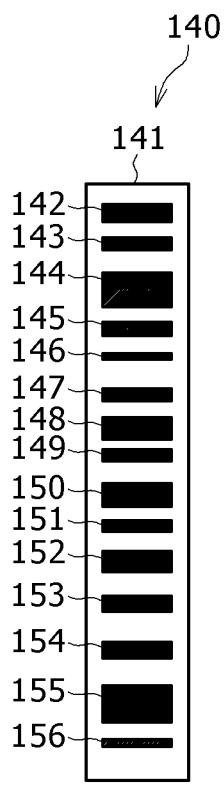
Figure 3C:
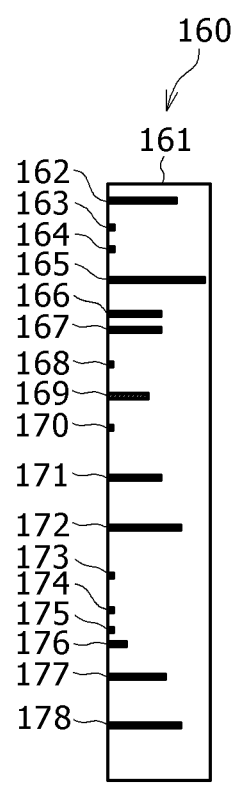

FIGS. 3A to 3C illustrate configuration examples of an imaging position display that is displayed in the image production device 100 of the embodiment of the present invention. FIG. 3A illustrates the configuration of an imaging position display 120 in which each position display corresponding to imaging date and time is based on imaging start date and time. The imaging position display 120 includes a period display 121, and imaging start position displays 122 to 136 that are each a position display corresponding to the imaging start date and time of the corresponding image.

The period display 121 represents a period for displaying the distribution of dates and times when the respective images are captured. Specifically, the longitudinal length of the period display 121 represents a period for displaying the distribution of dates and times when the respective images are captured. An example of the period for displaying the distribution of dates and times when the respective images are captured has a time range from 10 o'clock on the 1 Jan. 2005 to 22 o'clock on the 1 Jan. 2005.

The imaging start position displays 122 to 136 represent the position corresponding to the date and time when imaging of an image starts, relative to the period display. For example, when the period of the period display 121 is from 10 o'clock on the 1 Jan. 2005 to 22 o'clock on the 1 Jan. 2005, the imaging start position display 129, which exists at substantially the center of the period display 121, represents an image of which imaging starts around 16 o'clock on the 1 Jan. 2005.

FIG. 3B illustrates the configuration of an imaging position display 140 in which each position display corresponding to imaging date and time is based on imaging start date and time and an imaging time period. The imaging position display 140 includes a period display 141, and imaging time length displays 142 to 156 that represent the time length from start to end of imaging of an image.

The imaging position display 120 displays only the imaging start date and time of each image. In contrast, the imaging position display 140 represents not only the imaging start date and time of each image but also a display for the length of an imaging time period (hereinafter, referred to as an imaging time length display). In FIG. 3B, the length in the vertical direction of each of the imaging time length displays 142 to 156 represents the length of an imaging time period. The imaging time length displays 146 and 156, which are displays for a still image, have no length in the vertical direction. This is because the imaging time length of a still image is treated as 0 second.

FIG. 3C illustrates the configuration of an imaging position display 160 in which each position display corresponding to imaging date and time is based on imaging start date and time and a recorded volume. The imaging position display 160 includes a period display 161, and recorded volume length displays 162 to 178 that represent the recorded volume of an image as the length of the display.

The position of each of the recorded volume length displays 162 to 178 in the vertical direction represents the imaging date and time of an image similarly to the imaging start position displays shown in FIG. 3A. In contrast, the length of each of the displays 162 to 178 in the horizontal direction represents the magnitude of the recorded volume of an image. The magnitude of the recorded volume is expressed as the ratio of the recorded volume of each image to the recorded volume of the image corresponding to the recorded volume length display 165, which has the largest recorded volume among all the images. The recorded volume length display may be a display like one shown in FIG. 3B. Specifically, a display that represents the magnitude of a recorded volume may extend in the vertical direction from an imaging start position display as a start point.

The imaging position display 160 of FIG. 3C may be an imaging frequency display. The imaging frequency display includes a period display of which length in the vertical direction represents a period such as that from the 1 Jan. 2005 to the 15 Jan. 2005, and another display of which length in the horizontal direction represents the number of times of imaging per unit period (hereinafter, referred to as an number-of-imaging length display).

FIGS. 3A to 3C include only the imaging start position displays 122 to 136, only the imaging time length displays 142 to 156, and only the recorded volume length displays (number-of-imaging length displays) 162 to 178, respectively. However, these numbers of the illustrated displays are merely examples. A larger number of imaging times yields a larger number of imaging start position displays and so on, and a smaller number thereof yields a smaller number of imaging start position displays and so on.

Figure 4:
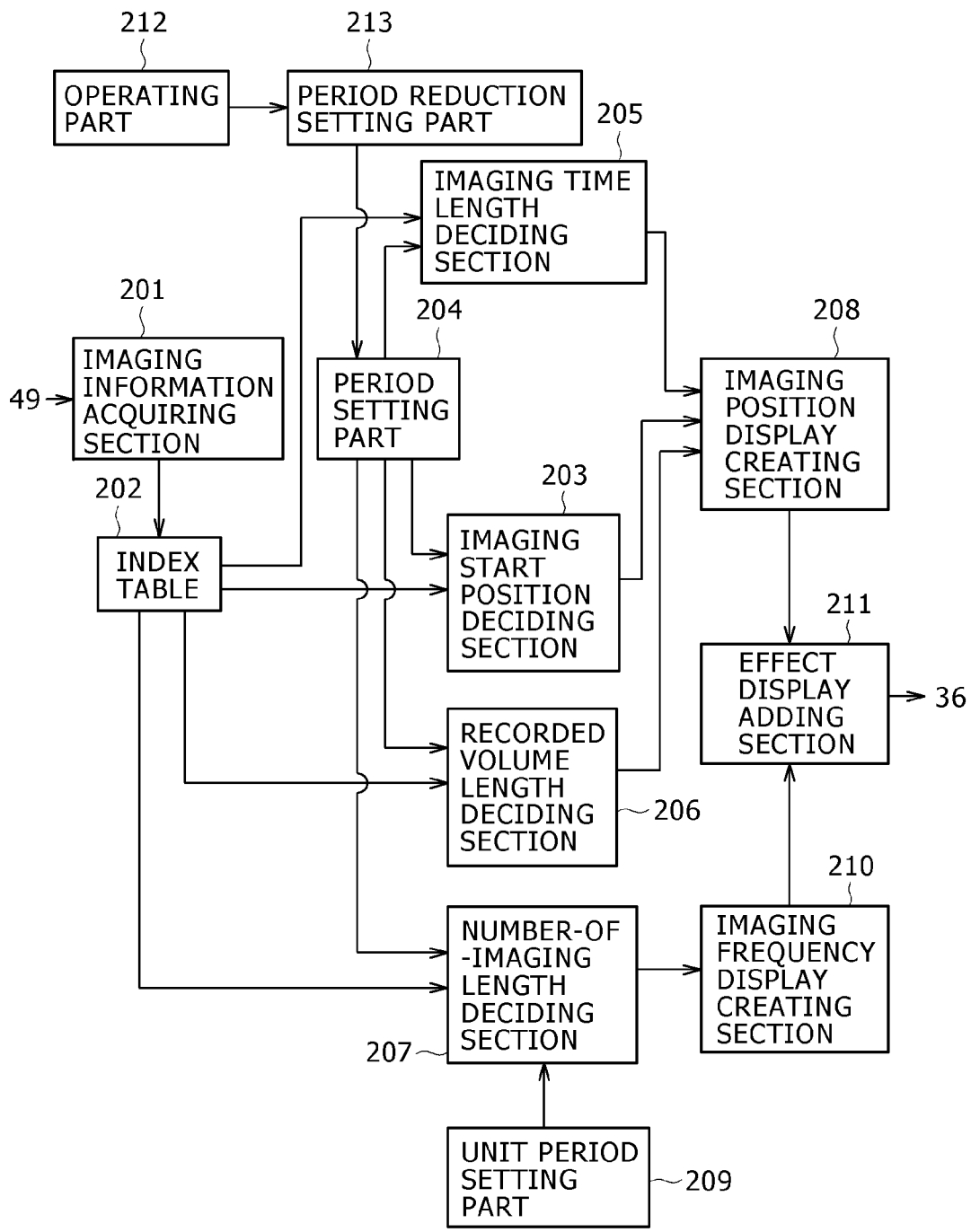
FIG. 4 illustrates one example of a configuration having a function for creating an imaging position display according to the embodiment.

FIG. 4 illustrates one example of a configuration having a function for creating an imaging position display according to the embodiment of the present invention. This functional configuration includes an imaging information acquiring section 201, an index table 202, an imaging start position deciding section 203, a period setting part 204, an imaging time length deciding section 205, a recorded volume length deciding section 206, a number-of-imaging length deciding section 207, an imaging position display creating section 208, a unit period setting part 209, an imaging frequency display creating section 210, an effect display adding section 211, an operating part 212, and a period reduction setting part 213.

The imaging information acquiring section 201 obtains, of data retrieved from the disk 49, the following information on moving image data and still image data (hereinafter, referred to as imaging information) relating to the file names of the moving image data and still image data, the imaging start date and time of the moving image data and still image data associated with the file names, the imaging time periods of the moving image data associated with the file names, the recorded volumes of the moving image data and still image data associated with the file names, and so on. The imaging information acquiring section 201 supplies the acquired imaging information to the index table 202. The index table 202 holds the imaging information supplied from the imaging information acquiring section 201.

Based on the imaging start date and time of each of moving image data and still image data, the imaging start position deciding section 203 decides where a display corresponding to the imaging start date and time of each of the moving image data and still image data is positioned relative to a period display of an imaging position display. The imaging start position deciding section 203 then supplies the decision result to the imaging position display creating section 208.

The period setting part 204 sets the period of the period display. This period setting is carried out by specifying the start date and time of the period and the end date and time thereof for example. Based on the set period, the imaging start position deciding section 203 decides the position, in the period display, of a display corresponding to the imaging date and time of each of the moving image data and still image data.

Based on the imaging start date and time and imaging time period of moving image data, the imaging time length deciding section 205 decides the display range of an imaging time length display of the moving image data relative to the period display. The imaging time length deciding section 205 then supplies the decision result to the imaging position display creating section 208.

The recorded volume length deciding section 206 calculates the length of a recorded volume length display based on the recorded volume of each of moving image data and still image data. The number-of-imaging length deciding section 207 decides the length a number-of-imaging length display per unit period on day or hour basis for example, based on the imaging date and time of moving image data and still image data. The recorded volume length deciding section 206 supplies the decision result to the imaging position display creating section 208. The number-of-imaging length deciding section 207 supplies the decision result to the imaging frequency display creating section 210.

The imaging position display creating section 208 creates an imaging position display based on the decision results supplied from the imaging start position deciding section 203, the imaging time length deciding section 205 and the recorded volume length deciding section 206. The imaging frequency display creating section 210 creates an imaging frequency display based on the decision result supplied from the number-of-imaging length deciding section 207.

The effect display adding section 211 adds an effect display to be described later to the imaging position display and imaging frequency display created by the imaging position display creating section 208 and the imaging frequency display creating section 210, respectively. The effect display adding section 211 then supplies the display controlling section 36 with the imaging position display and imaging frequency display to which the effect display has been added.

The imaging position display and imaging frequency display to which the effect display has been added are displayed on the display part 42.

The unit period setting part 209 sets a unit period when the numbers of imaging are displayed. It is possible that the unit period is one day or one hour for example.

The operating part 212 is to optionally select any part in an imaging position display. For example, when a user wants to select the center part of an imaging position display, the user employs the operating part 212 to thereby select the center part. The period reduction setting part 213 implements such period reduction setting for the period setting part 204 that, after the selection of certain part in an imaging position display through the operating part 212, the period of a period display includes the date and time of the selected part and becomes shorter than the period before the selection. Specifically, when part around 12 o'clock on the 1 Jan. 2005 in an imaging position display is selected through the operating part 212 for example, the period reduction setting part 213 implements such setting for the period setting part 204 that the period of a period display becomes from 12 o'clock on the 1 Jan. 2005 to 13 o'clock on the same day.

The imaging information acquiring section 201 can be realized by the disk interface 23 in FIG. 2, for example. Mainly the processing device 31 allows the realization of the imaging start position deciding section 203, the period setting part 204, the imaging time length deciding section 205, the recorded volume length deciding section 206, the number-of-imaging length deciding section 207, the imaging position display creating section 208, the unit period setting part 209, the imaging frequency display creating section 210, the effect display adding section 211, and the period reduction setting part 213. The index table 202 can be realized by the RAM 34. The operating part 212 can be realized by the operation input interface 35 and the operating inputting part 41.

Figure 5:
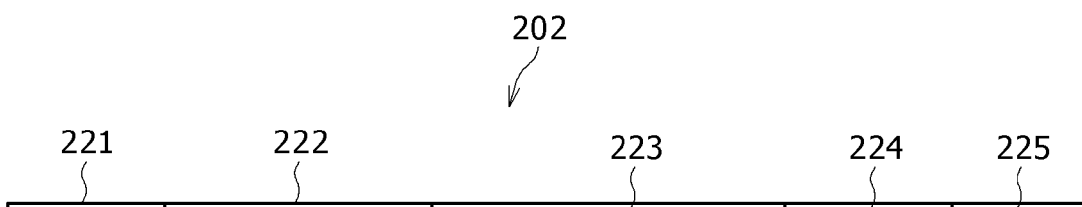
FIG. 5 illustrates one example of an index table according to the embodiment.

FIG. 5 is a diagram illustrating one example of the index table 202. The index table 202 includes file names 221, identification flags 222, imaging start dates and times 223, imaging time lengths 224, and file sizes 225. Each file name 221 represents the file name of moving image data or still image data. MOVIE01 to MOVIE04 correspond to moving image data files. IMG01 and IMG02 correspond to still image data files.

Each identification flag 222 displays which of moving image data or still image data the data associated with the file name 221 is. In FIG. 5, the identification flag 222 represents a circle (◦) when the corresponding data associated with the file name 221 is moving image data, while it represents a cross (×) when the data is still image data. The imaging start dates and times 223 indicate the imaging start dates and times of the moving image data and still image data. The imaging start date and time 223 is represented as year, month, day and time, and the minimum unit of time is a second, for example. The expression "2005:01:01:10:50:23" in FIG. 5 means ten fifty and twenty three seconds on the 1 Jan. 2005. The imaging time lengths 224 indicate the lengths of the imaging time period of the moving image data and still image data. The expression "6:21" in FIG. 5 means six minutes and twenty one seconds. For still image data, the imaging time length 224 represents "0", which means zero second.

Each file size 225 displays the recorded volume of the moving image data or still image data associated with the file name 221. The expressions "M" and "K" in FIG. 5 display the units corresponding to megabytes and kilobytes, respectively.

Figure 6:
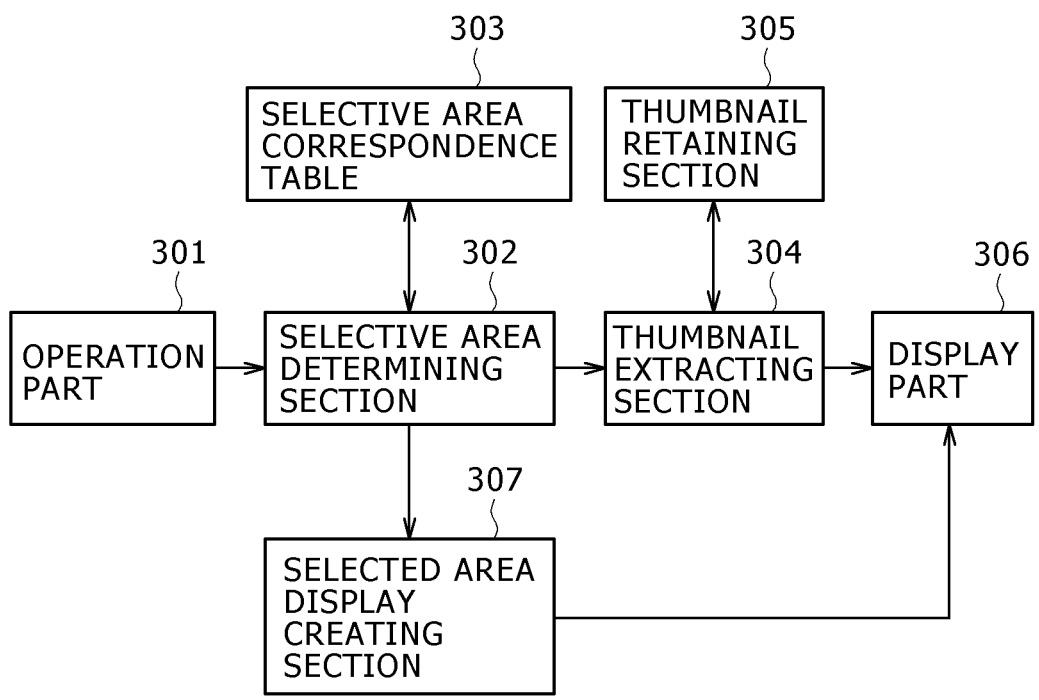
FIG. 6 illustrates one example of a configuration having a function for displaying an imaging position display in association with thumbnail displays according to the embodiment.

FIG. 6 shows one example of a configuration having a function for displaying an imaging position display in association with thumbnail displays according to the embodiment of the present invention (hereinafter, referred to as an display associating function). The configuration with the display associating function includes an operating part 301, a selective area determining section 302, a selective area correspondence table 303, a thumbnail extracting section 304, a thumbnail retaining section 305, a display part 306, and a selected area display creating section 307.

The operating part 301 is to optionally select any point in an imaging position display. In the embodiment of the present invention, the operating part 301 may be based on a touch panel system for example. When any point in an imaging position display is selected with use of the operating part 301, the selective area determining section 302 determines which selective area the selected point belongs to. The selective area refers to each of divided areas resulting from division of a period display into the certain number of areas. The determination as to which selective area includes the selected point is implemented based on information in the selective area correspondence table 303. Upon the determination of the selective area determining section 302 about the selective area, information on the thumbnails corresponding to the determined selective area is sent to the thumbnail extracting section 304.

The selective area correspondence table 303 holds information about selective areas and thumbnails corresponding to the selective areas. The thumbnail extracting section 304 extracts necessary thumbnails from the thumbnail retaining section 305 and sends them to the display part 306, based on information on thumbnails sent from the selective area determining section 302.

The thumbnail retaining section 305 holds the thumbnails of moving image data and still image data stored in a recording medium. As the thumbnail of moving image data, an image resulting from reduction of the top picture of the data of the corresponding moving image file name is used for example. The display part 306 displays the thumbnails sent from the thumbnail extracting section 304.

The selected area display creating section 307 creates a selected area display that represents the selective area selected through the operating part 301. The created selected area display is represented on an imaging position display.

Due to the above-described display associating function, when any point in an imaging position display is selected through the operating part 301, the thumbnails corresponding to the selected point are displayed on the display part 306.

The selective area determining section 302, the thumbnail extracting section 304 and the selected area display creating section 307 can be realized mainly by the processing device 31. The operating part 301 can be realized by the operation input interface 35 and the operating inputting part 41. The selective area correspondence table 303 and the thumbnail retaining section 305 can be realized by the RAM 34.

Figure 7:
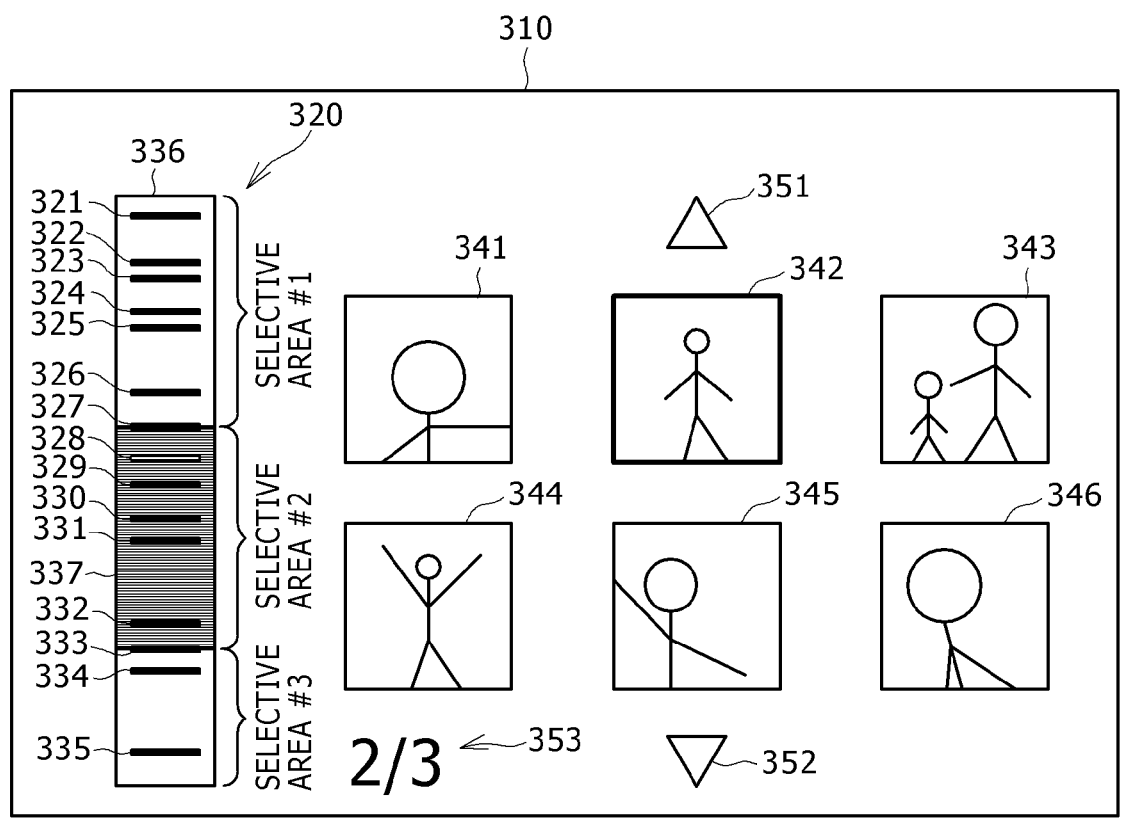
FIG. 7 illustrates one example of the display screen of the image production device according to the embodiment.

FIG. 7 illustrates one example of the display screen of the image production device of the embodiment of the present invention. Displayed in a display screen 310 are an imaging position display 320 that includes a period display 336 and imaging start position displays 321 to 335, a selected area display 337, thumbnail displays 341 to 346, screen scroll buttons 351 and 352, and a selected page 353 that represents the page of the currently displayed screen.

The imaging position display 320 is similar to the imaging position display shown in FIG. 3A. Alternatively, it may be the imaging position display shown in FIG. 3B or the imaging frequency display shown in FIG. 3C. The details of the period display 336, the imaging start position displays 321 to 335 and the imaging position display 320 are not described here since they have been already described with FIGS. 3A to 3C.

In FIG. 7, the imaging position display 320 is divided into three selective areas. FIG. 7 depicts an example in which a period display is divided into three areas that each includes six imaging start position displays. The area from the upper end of the imaging position display 320 to the boundary immediately anterior to the imaging start position display 327 is represented as a selective area #1. The area from the imaging start position display 327 to the boundary immediately anterior to the imaging start position display 333 is represented as a selective area #2. The area from the imaging start position display 333 to the lower end of the imaging position display 320 is represented as a selective area #3.

In the image production device 100 of the embodiment of the present invention, the thumbnail displays 341 to 346 displayed on the display screen 310 are the thumbnails corresponding to the imaging start position displays 327 to 332 in the selective area #2. Specifically, when any point in the selective area #2 is selected through the operating part 301, the thumbnail displays 341 to 346 are displayed on the display screen 310 due to the display associating function described with FIG. 6. The imaging start position display 327 corresponds to the thumbnail display 341. The imaging start position display 328 corresponds to the thumbnail display 342. The imaging start position display 329 corresponds to the thumbnail display 343. The imaging start position display 330 corresponds to the thumbnail display 344. The imaging start position display 331 corresponds to the thumbnail display 345. The imaging start position display 332 corresponds to the thumbnail display 346.

In addition, on the selected selective area, the selected area display 337 created by the selected area display creating section 307 is displayed. This display allows a user to easily recognize the selective area corresponding to the thumbnail displays displayed on the display screen 310. When the screen scroll button 351 is selected through the operating part 301 in the state of FIG. 7, the thumbnails corresponding to the selective area #1 are displayed and the selected area display 337 is displayed on the selective area #1.

When the screen scroll button 352 is selected through the operating part 301 in the state of FIG. 7, the thumbnails corresponding to the selective area #3 are displayed and the selected area display 337 is displayed on the selective area #3. The selected page 353 represents "the selective area currently displayed on the display screen 501/the number of the entire selective areas". In FIG. 7, since the selective area currently displayed on the display screen 501 is the selective area #2 and the number of the entire selective areas is three, the representation "2/3" is displayed.

When any point in the imaging position display 320 is selected, part around the selected point may be magnified. When the operation method is based on a touch panel system for example, the selection of any point is conducted by a direct contact with the imaging position display 320 displayed on the display screen 310. The expression "part around the selected point is magnified" means the following operation for example. Specifically, when initially the period range of the period display 336 is from 10 o'clock on the 1 Jan. 2005 to 22 o'clock on the 1 Jan. 2005, selecting the center part of the imaging position display 320 leads to a change of the period range of the period display 336 to the range from 16 o'clock on the 1 Jan. 2005 to 17 o'clock on the 1 Jan. 2005, i.e., a change to an imaging position display with a one-hour range. This operation is realized by the period reduction setting part 213.

In addition, an effect display may be displayed on the imaging position display 320 although not illustrated in the drawing. This display is realized by the effect display adding section 211. The effect display is as follows for example. The color of background of the imaging position display 320 corresponding to the time range from 6:00 AM to 5:00 PM is made white, while that corresponding to the other time range is made gray. Such effect display is merely an example, and another effect display based on a different classification way may be added.

FIG. 8 is a diagram illustrating one example of the above-described selective area correspondence table 303. The selective area 371 displays the selective area numbers. The corresponding area 372 displays, by coordinates, the parts on the display screen corresponding to selective areas. In FIG. 7 for example, since the imaging position display 320 has a rectangular shape, a selective area can be expressed by two coordinates with any coordinate system being defined on the display screen.

The selective area 1 is equivalent to the range on the display screen expressed by coordinates {(X1, Y1), (X2, Y2)}. The selective area 2 is equivalent to the range on the display screen expressed by coordinates {(X3, Y3), (X4, Y4)}. The selective area 3 is equivalent to the range on the display screen expressed by coordinates {(X5, Y5), (X6, Y6)}. Since the position on the display screen can be specified with the position of a pixel, such treatment of selective areas with use of coordinates is allowed.

The corresponding thumbnail 373 displays the thumbnails corresponding to the selective area 371. The thumbnails corresponding to the selective area 1 have thumbnail data expressed as thumbnail #1 to 6 (IMG1.jpg to IMG6.jpg). The thumbnails corresponding to the selective area have thumbnail data expressed as thumbnail #7 to 11 (IMG7.jpg to IMG11.jpg). The thumbnails corresponding to the selective area 3 have thumbnail data expressed as thumbnail #12 to 13 (IMG12.jpg to IMG13.jpg).

Figure 9:
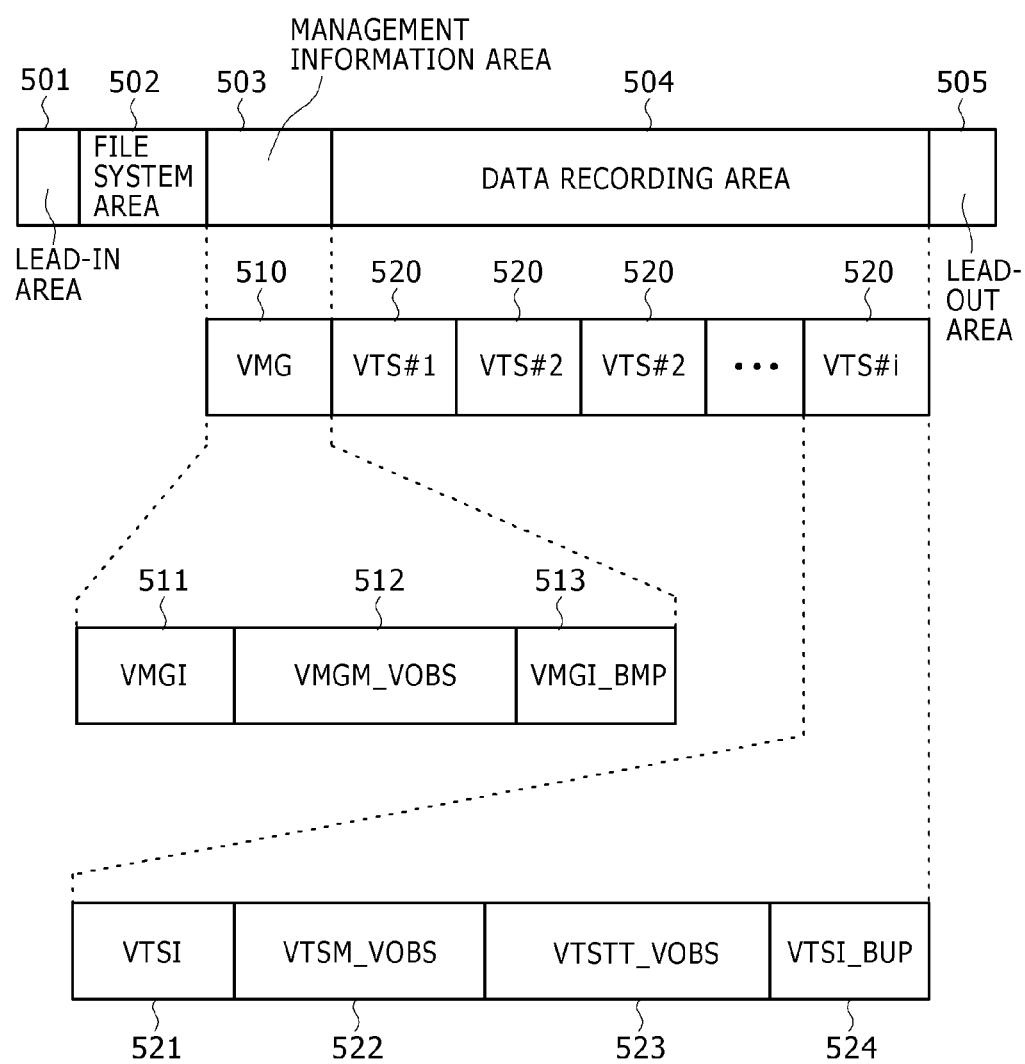
FIG. 9 is a diagram showing the data configuration of a disk when a disk according to the DVD-Video standard is used as a disk in the embodiment.

FIG. 9 is a diagram showing the data configuration of a disk when a disk according to the DVD-Video standard is used as the disk 49 in the embodiment of the present invention. The disk has a discus configuration, and includes a lead-in area 501, a file system area 502, a management information area 503, a data recording area 504, and a lead-out area 505 in that order from the inner periphery of the disk. The file system area 502 is a management area for a file system, and is in conformity with the ISO 9660 standard and the universal disk format (UDF) standard. The management information area 503 is an area that holds the management information of the entire video contents recorded in the disk. The data recording area 504 is an area that holds the content of each video titles set and the control information of the video titles set.

The management information area 503 holds a VMG (video manager) 510. The VMG 510 includes VMGI (VMG information) 511, a VMGM_VOBS (video object set for VMG menu) 512, and VMGI_BUP (VMGI for back up) 513. The VMGI 511 holds the management information of each title in video contents recorded in the disk, and the control information of the top menu. The VMGM_VOBS 512 holds the data of the top menu. The VMGI_BUP 513 is a back-up copy of the VMGI 511.

The data recording area 504 holds at least one VTS (video titles set) 520. Each VTS 520 includes VTSI (VTS information) 521, a VTSM_VOBS (video object set for VTS menu) 522, a VTSTT_VOBS (video object set for titles in a VTS) 523, and VTSI_BUP (VTSI for back up) 524. The VTSI 521 holds the management information and control information of each chapter of titles included in the video titles set, and the control information of the chapter menu. The VTSM_VOBS 522 holds the data of the chapter menu. The VTSTT_VOBS 523 holds the data of titles included in the video titles set. The VTSI_BUP 524 is a back-up copy of the VTSI 521.

Figure 10:
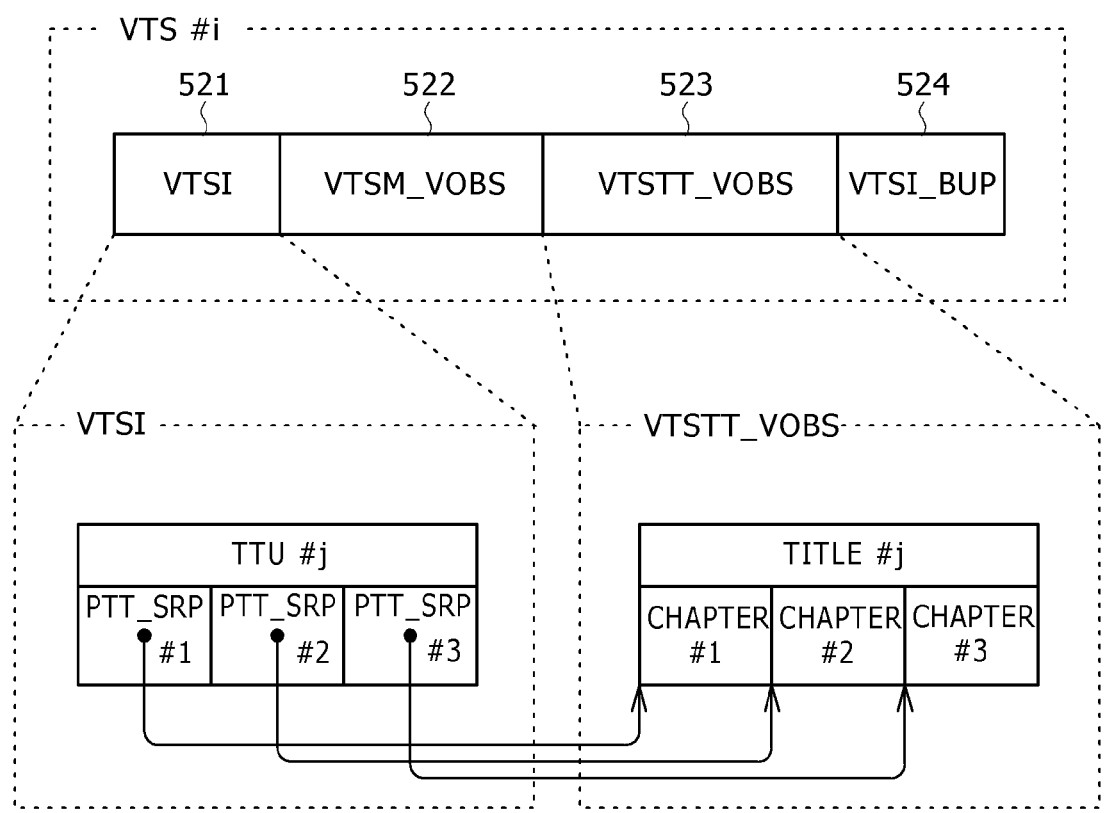
FIG. 10 is a diagram showing the relationship between titles and chapters in a video titles set (VTS)

FIG. 10 is a diagram showing the relationship between titles and chapters in a video titles set (VTS). As described above, the actual data of video contents is recorded in the VTSTT_VOBS 523. Each VTS 520 can store up to 99 titles. However, the maximum number of titles that can be stored in the entire disk is also 99. Therefore, the maximum number of titles in one VTS 520 is affected by the use condition of other VTSs.

Each title in the VTS 520 is divided into at least one chapter. The maximum number of chapters in each title is 99. In a camcorder, a recording unit from start to end of one time recording is recorded as one chapter, and subsequent chapters are produced in the same title until the occurrence of any of the following events for example: ejection of the disk, attainment of the number of chapters to 99 in the title, attainment of the number of cells to 99 in the title, and transition from moving image recording to still image recording. Therefore, if the number of chapters in a title reaches 99 when recording is repeated with a camcorder, the title is closed and the next chapter is produced in a new title.

The VTSI 521 holds the start positions of chapters in each title. As described later, the VTSI 521 holds pointers (PTT_SRP) that display the start positions of the respective chapters as management information (TTU) of each title.

It is assumable that one chapter corresponds to moving image data associated with one file name 221 in the index table shown in FIG. 5.

Figure 11:
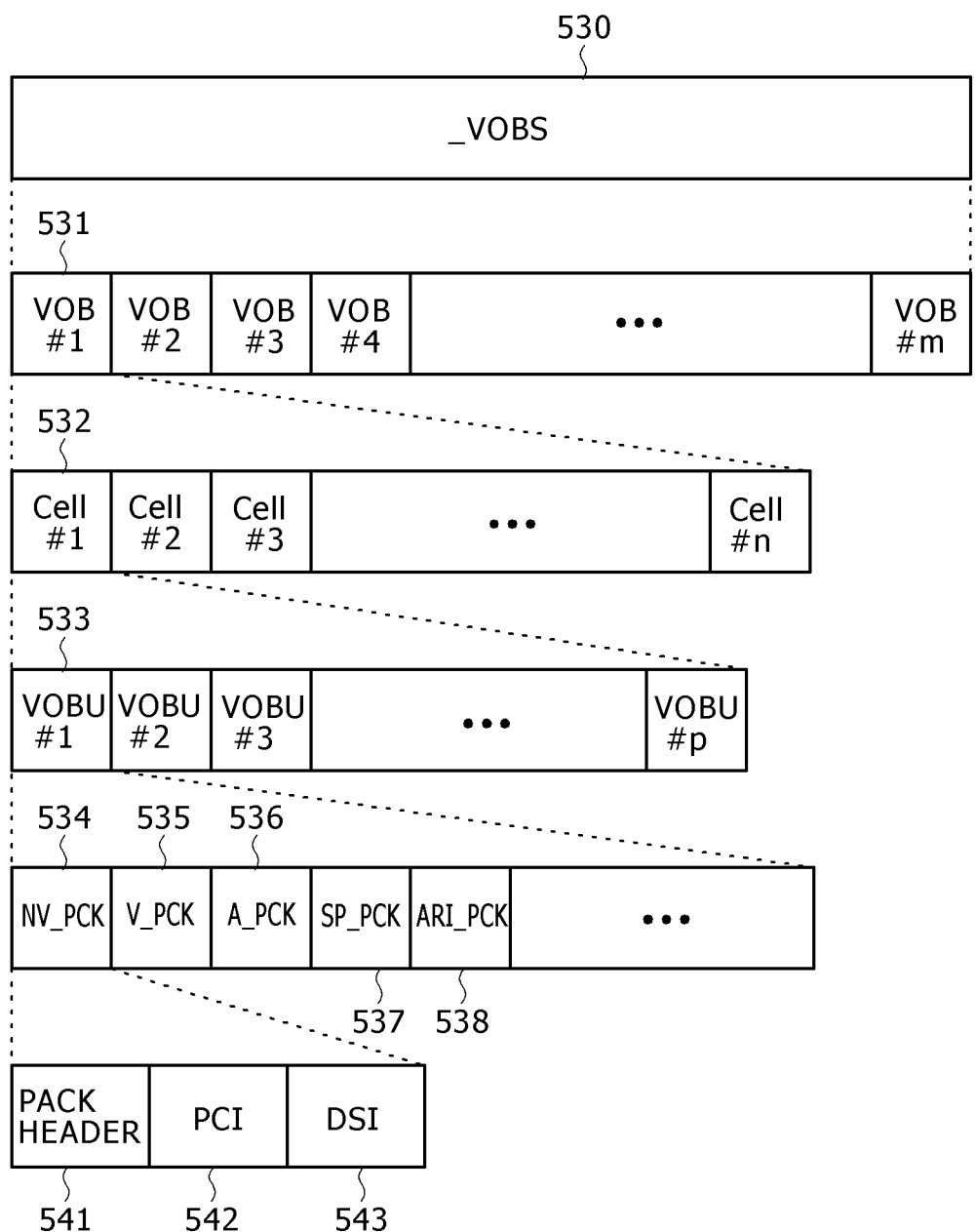
FIG. 11 is a diagram showing configuration components of a video objects set (YOBS)

FIG. 11 is a diagram showing configuration components of a video object set (VOBS). The VMGM_VOBS 512, the VTSM_VOBS 522 and the VTSTT_VOBS 523 in FIG. 9 hold the respective data as a video objects set (VOBS), and has a common format. The VOBS 530 exists as an assembly of at least one video object (VOB) 531. The VOB 531 is composed of at least one cell 532.

The cell 532 includes at least one video object unit (VOBU) 533. The VOBU 533 is composed of a pack sequence that includes a navigation pack (NV_PCK) 534 as the beginning pack. Each pack is composed of 2048 bytes of fixed data. The pack sequence includes, in addition to the beginning NV_PCK 534, a video pack (V_PCK) 535 that holds video data, an audio pack (A_PCK) 536 that holds audio data, a sub-picture pack (SP_PCK) 537 that holds sub-picture data, an additional recorded information pack (ARI_PCK) 538 that holds additional recorded information, and so on according to need.

The NV_PCK 534 includes a pack header 541, and holds subsequent thereto, presentation control information (PCI) 542 and data search information (DSI) 543. The PCI 542 is control information regarding reproduction display. The DSI 543 is control information for access to the disk.

FIG. 12 is a diagram showing the data configuration of an additional recorded information pack (ARI_PCK) according to the embodiment of the present invention. Information included in the ARI_PCK 538 is roughly classified into four kinds of information: an additional recorded information identifier, application information, recording time information and camera information.

The additional recorded information identifier is an identifier for recognition that the data in the packet is additional recorded information, and an additional recorded information data identifier (ARI_DAT_ID) and the version number of the additional recorded information data (ARI_DAT_VER) are recorded in the identifier.

The application information includes a vendor name (VND_NAME) that represents the name of the manufacturer of the product, and a product name (PRD_NAME) that represents the name of the product.

Recorded in the recording time information are a time zone (VOBU_LCL_TM_ZONE) when additional recorded information data (ARI_DATA) regarding a VOBU including the additional recorded information is recorded, and the recording time of the ARI_DATA (VOBU_REC_TM). The VOBU_REC_TM is expressed by units of year, month, date, hour, minute and second as the imaging time of the I picture frame. In the VOBU_LCL_TM_ZONE, the time zone relative to the VOBU_REC_TM is recorded. The time zone refers to the offset time from the coordinated universal time (UTC), set in the apparatus by a user. That is, the time zone is the time difference corresponding to the time (local time) of the country where the recording device is used. As the VOBU_REC_TM, the universal time (the official time used all over the world in recording of time) can also be used. In this case, the VOBU_LCL_TM_ZONE is set to zero.

If a disk according to the DVD-Video standard is used as the disk 49 in the embodiment of the present invention, the recording time of the ARI_DATA (VOBU_REC_TM) is used as the imaging start date and time and the imaging time period of moving image data. Used as the imaging start date and time of moving image data is the recording time of the ARI_DATA (VOBU_REC_TM) of the I picture frame at the beginning of the moving image file for example. This recording time is used as the imaging start date and time 223 in the index table of FIG. 5. In addition, the length of the imaging time of moving image data is obtained by taking the difference between the recording time of the ARI_DATA (VOBU_REC_TM) of the I picture frame at the last of the moving image file and that of the I picture frame at the beginning of the moving image file for example. The obtained time length is used as the imaging time length 224 in the index table of FIG. 5. Furthermore, the recorded volume stored based on the UDF is used as the file size 225 in the index table of FIG. 5.

The camera information includes information such as a F number (F_NUM) and exposure time (EXP_TM) as information on setting conditions in imaging.

As for still images, e.g. a folder compatible with the still-image DCF (design rule for camera file system) is provided in a disk of the DVD-Video standard, and still image data is stored in the folder. In the DCF, the Exif (exchangeable image file format) is used as the format of still image data. In this case, the imaging date and time stored in the header of the Exif is used as the imaging start date and time 223 in the index table of FIG. 5. Furthermore, the recorded volume of still image data is also stored in the header of the Exif, and is used as the file size 225 in the index table of FIG. 5.

FIG. 13 is a diagram showing the relationship between a period display 380 and a certain imaging start position display 381. The period display 380 and the imaging start position display 381 have the following relationship. When the period start date and time, the period end date and time, and the imaging start date and time in the period display 380 are defined as T1, T2, and T3, respectively, the position of the imaging start position display 381 can be decided based on the equation $\{(T3-T1)/(T2-T1)\}$.

The imaging start position deciding section 203 decides the imaging start position by using this equation, and the decision result is sent to the imaging position display creating section 208, where an imaging position display is created.

Figure 14:
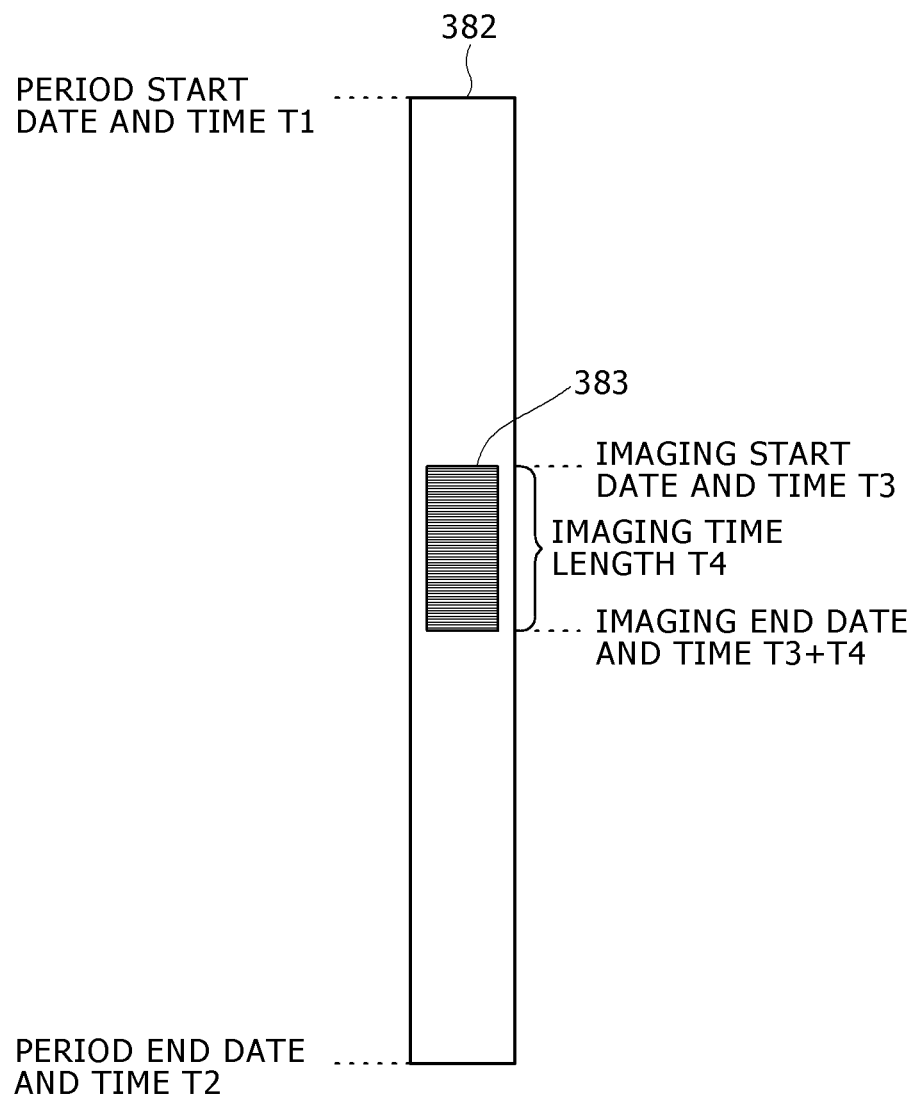
FIG. 14 is a diagram showing the relationship between a period display and a certain imaging time length display according to the embodiment.

FIG. 14 is a diagram showing the relationship between a period display 382 and a certain imaging time length display 383. The period display 382 and the imaging time length display 383 have the following relationship. When the period start date and time, the period end date and time, and the imaging time length in the period display 382 are defined as T1, T2, and T4, respectively, the display range of the imaging time length display 383 can be decided based on the equation {T4/(T2−T1)}. This equation is used to decide the display range of the imaging time length display 383 in the period display 382. The imaging time length display 383 is displayed with the imaging start position described in FIG. 13 being defined as the start position of the display range of the imaging time length display 383.

The imaging time length deciding section 205 decides the imaging time length by using the equation, and the decision result is sent to the imaging position display creating section 208, where an imaging position display is created.

Figure 15:
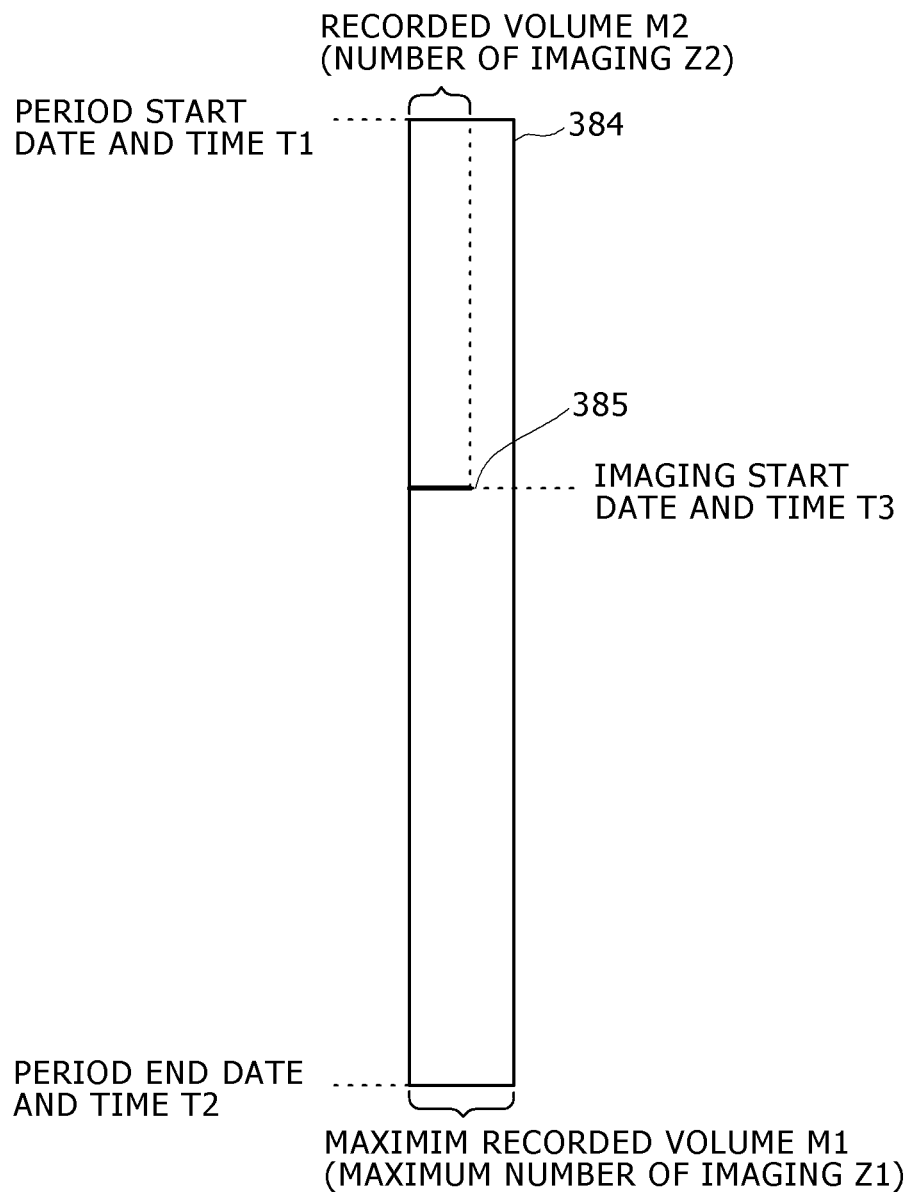
FIG. 15 is a diagram showing the relationship between a period display and a certain recorded volume length display according to the embodiment.

FIG. 15 is a diagram showing the relationship between a period display 384 and a certain recorded volume length display 385. The period display 384 and the recorded volume length display 385 have the following relationship. When the maximum recorded volume among recorded volumes of images to be displayed on an imaging position display is defined as M1, and the recorded volume of a certain image to be displayed on the imaging position display is defined as M2, the display range of the recorded volume length of the certain image is decided based on the equation (M2/M1). In addition, if the display in FIG. 15 is an imaging frequency display, when the maximum number of imaging per unit period in the period of the period display 384 is defined as Z1, and the number of imaging in a certain unit period in the period of the period display 384 is defined as Z2, the display range of the number-of-imaging length display of the certain unit period is decided based on the equation (Z2/Z1). The positions of the recorded volume length display and number-of-imaging length display in the vertical direction of FIG. 15 are decided by a method similar to that for the imaging start position display 381 in FIG. 13.

The recorded volume length deciding section 206 and the number-of-imaging length deciding section 207 decide the display range of the imaging time length display and the number-of-imaging length display, respectively, by using the above-described equation. The decision results are sent to the imaging position display creating section 208 and the imaging frequency display creating section 210, where an imaging position display and an imaging frequency display, respectively, are created.

Operations in the embodiment of the present invention will be described below with reference to the drawings.

Figure 16:
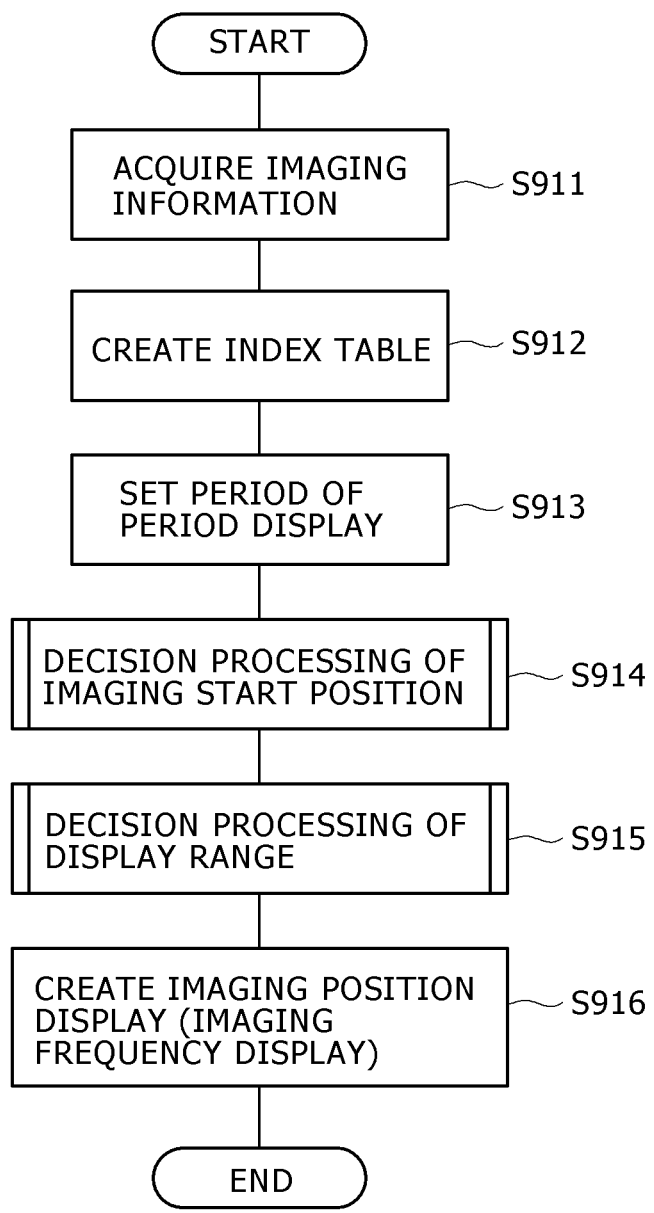
FIG. 16 is a diagram showing the flow of creation of an imaging position display according to the embodiment.

FIG. 16 is a diagram showing the flow of creation of an imaging position display in the embodiment of the invention. Initially, imaging information on moving image data and still image data is acquired from a recording medium (S911). An index table is then created based on the imaging information (S912). The index table is composed of the file names 221, the identification flags 222, the imaging start dates and times 223, the imaging time lengths 224 and the file sizes 225, shown in FIG. 5 for example.

Subsequently, the period of a period display is set (S913). Specifically, a time range such as the range from 10 o'clock on the 18 Feb. 2005 to 18 o'clock on the 18 Feb. 2005 is set. Based on the information about each of the moving image data and still image data in the index table, imaging start positions in the period display set in the step S913 are decided (S914).

Furthermore, based on the imaging information about each of the moving image data and still image data in the index table, the display ranges of imaging time length displays in the period display set in the step S913 are decided (S915). The operation flow is not limited to the example of FIG. 15, in which the display ranges of imaging time length displays in a period display are decided in the step S915. The display ranges of recorded volume length displays or number-of-imaging length displays of images may be decided in the step S915.

Based on the decision results in the steps S914 and S915, an imaging position display is created (S916). When the display ranges of number-of-imaging length displays are decided in the step S915, an imaging frequency display is created in the step S916.

Figure 17:
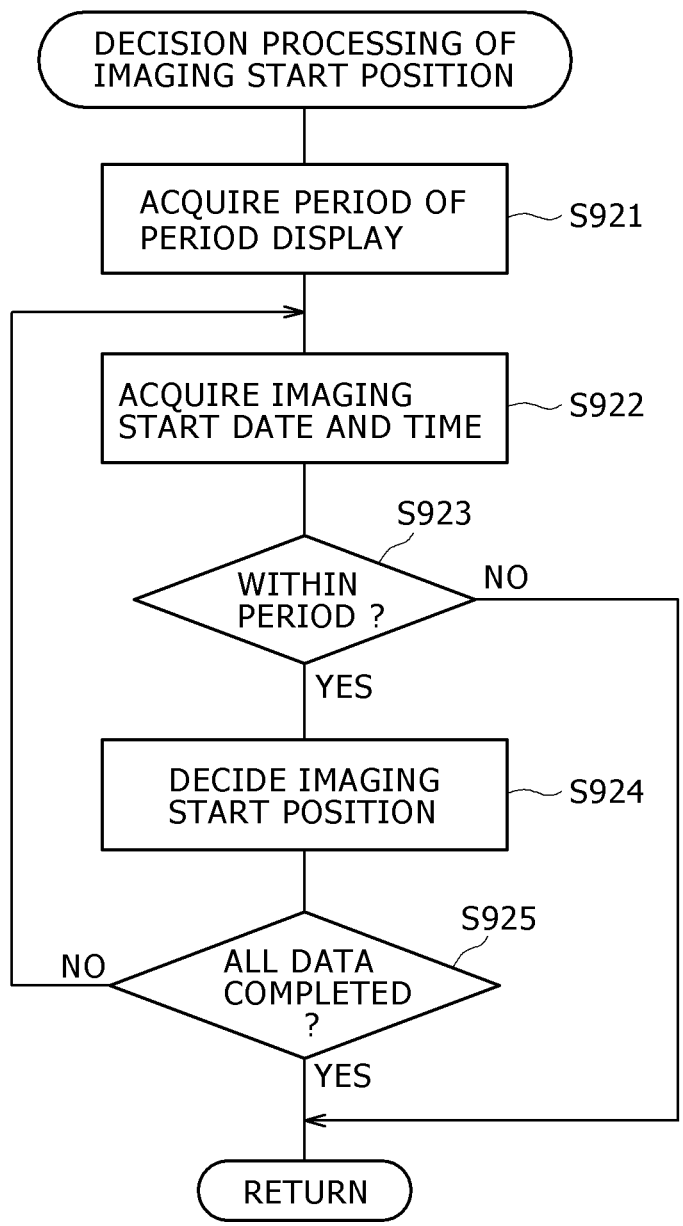
FIG. 17 is a diagram showing the flow of calculation of an imaging start position according to the embodiment.

FIG. 17 is a diagram showing the flow of calculation of imaging start positions. Initially, information on the period of a period display is acquired (S921). The period of the period display can be specified from the start date and time and end date and time of the period display. Subsequently, the imaging start date and time of image data is acquired (S922). A determination is then made as to whether or not the imaging start date and time of the image data is included in the period of the period display (S923).

If a determination is made that the imaging start date and time is included in the period of the period display, an imaging start position in the period display is decided based on the information acquired in the steps S921 and S922 (S924). The method for this decision is as follows. When the start date and time and end date and time of the period display are defined as T1 and T2, respectively, and the imaging start date and time of a target image data is defined as T3, the imaging start position relative to the period display is decided based on the calculation result from the equation {(T3−T1)/(T2−T1)}. If a determination is made that the imaging start date and time of image data is not included in the period of the period display, the operation flow directly proceeds to the end with no processing being executed. Until processing for the entire target image data is completed, the steps S922 to S924 are repeated (S925).

Figure 18:
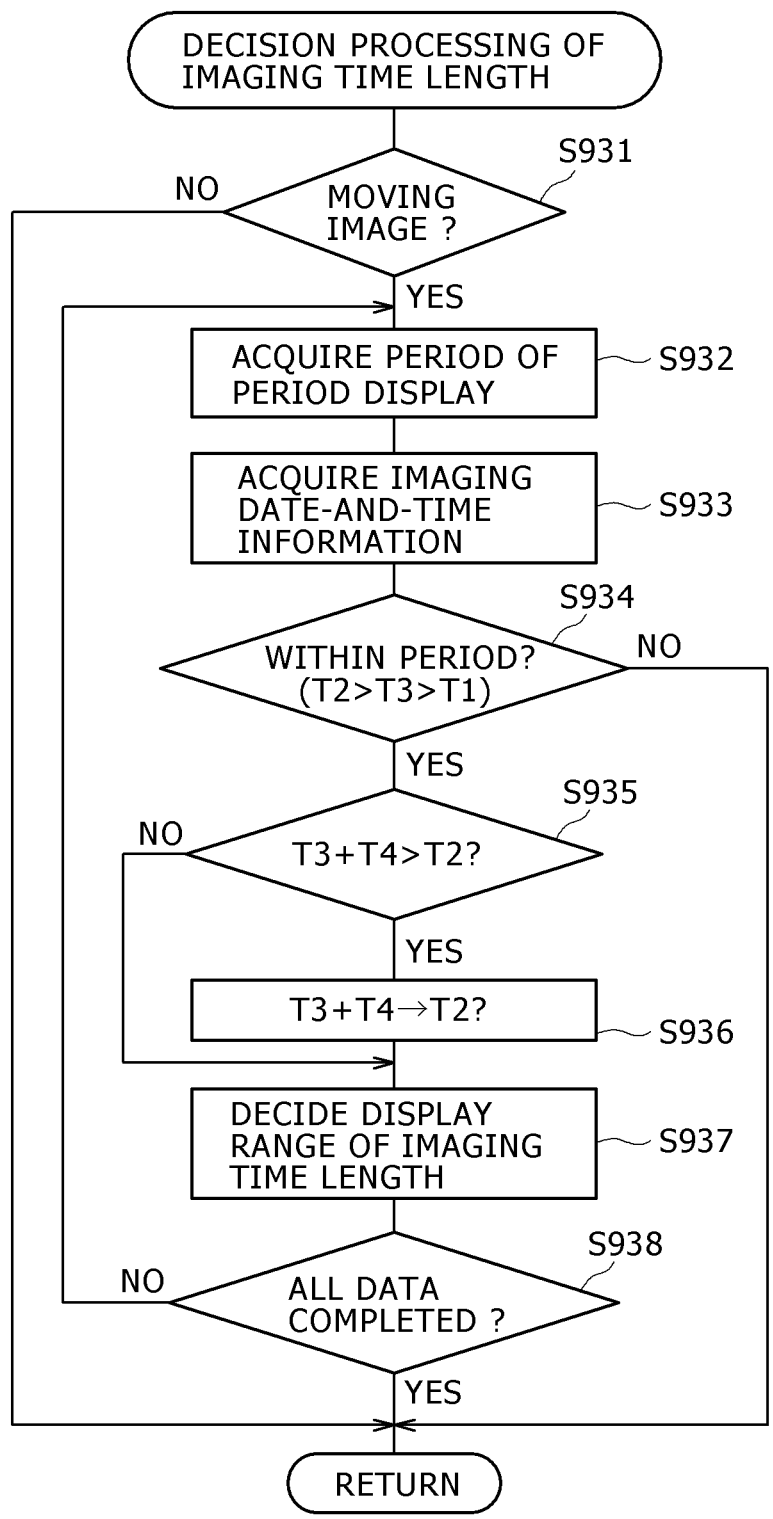
FIG. 18 is a diagram showing the decision flow of the display range of an imaging time length according to the embodiment.

FIG. 18 is a diagram showing the flow of decision of display ranges of imaging time lengths. A determination is made as to whether moving image data or still image data the data to be subjected to the decision is (S931). This determination is made based on the identification flag 222 in the index table shown in FIG. 5. If the data is still image data, the operation flow proceeds to the end since the imaging time length thereof is treated as 0 second. If the data is moving image data, information on the period of a period display is acquired (S932). The period of the period display can be specified from the start date and time T1 and the end date and time T2 of the period display. Subsequently, the imaging start date and time T3 and the imaging time length T4 of the moving image data are acquired (S933). A determination is then made as to whether or not the imaging start date and time of the moving image data is included in the period of the period display (S934).

If a determination is made that the imaging start date and time of the moving image data is included in the period of the period display, the next determination is made as to which of the end date and time T2 of the period display and the imaging end date and time (T3+T4) is the later date and time (S935). If the imaging end date and time (T3+T4) of the moving image data is the later date and time, the imaging end date and time (T3+T4) of the moving image data is replaced by the end date and time T2 of the period display (S936). If the end date and time T2 is the later date and time, this replacing is not carried out.

The display range of the imaging time length display is calculated based on the information acquired in the steps S932 and S933 (S937). The display range of the imaging time length display relative to the period display is decided based on the calculation result from the equation {(T4)/(T2−T1)}. If the imaging end date and time (T3+T4) of the moving image data has been replaced by the end date and time T2 of the period display in the step S936, the display range of the imaging time length display relative to the period display is decided based on the calculation result from the equation $\{(T2-T3)/(T2-T1)\}$.

If a determination is made that the imaging start date and time of the moving image data is not included in the period of the period display, the operation flow directly proceeds to the end with no processing being executed. The steps S932 to S937 are repeated for the entire image data, and then the operation flow proceeds to the end (S938).

Figure 19:
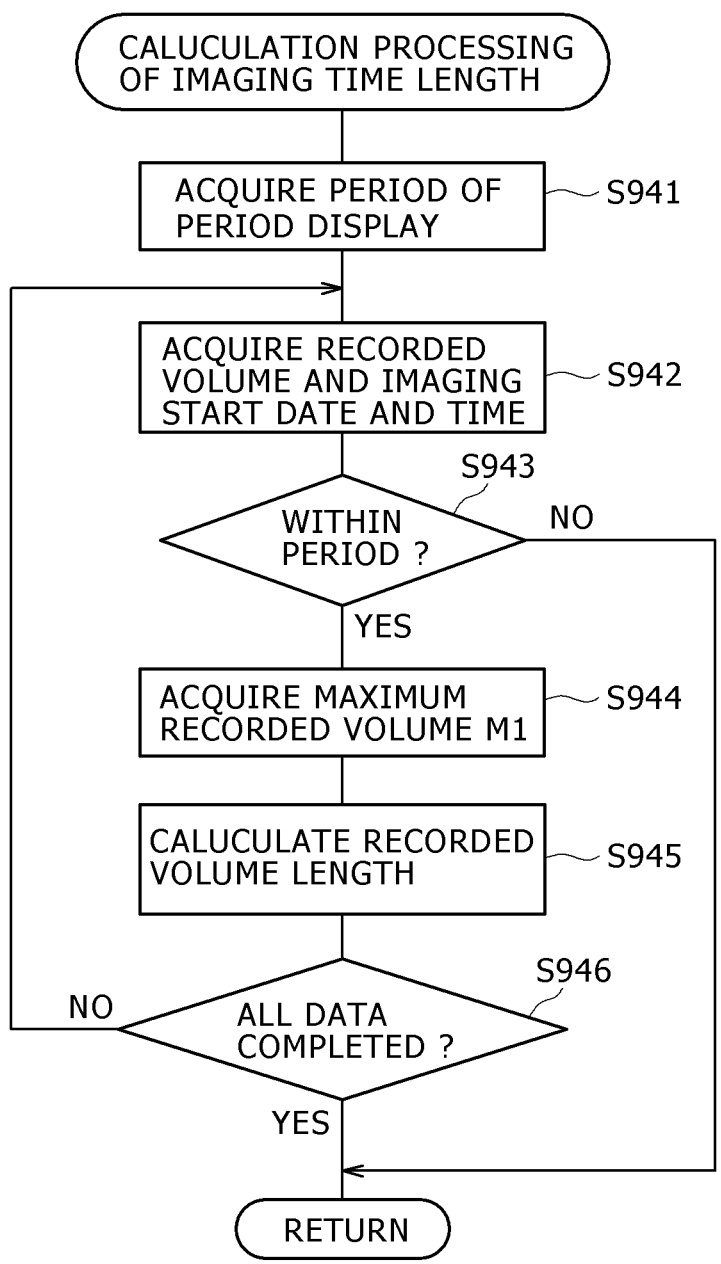
FIG. 19 is a diagram showing the decision flow of the display range of a recorded volume length display according to the embodiment.

FIG. 19 is a diagram showing the flow of decision of display ranges of recorded volume length displays. Initially, information on the period of a period display is acquired (S941). Subsequently, the imaging start date and time and recorded volume of an image are acquired (S942). They are acquired from the index table shown in FIG. 5 for example. A determination is then made as to whether or not the imaging start date and time of the image is included in the period of the period display (S943). As for the image data of which imaging start date and time is not included in the period of the period display, no processing is executed and the operation flow directly proceeds to the end. The maximum recorded volume M1 among the recorded volumes of image data of which imaging start date and time is included in the period of the period display is acquired (S944).

Subsequently, the display range of a recorded volume length is calculated (S945). This display range of a recorded volume length is calculated based on the ratio of a recorded volume M2 to the maximum recorded volume M1 acquired in the step S944, for example. The steps S942 to S945 are repeated for the entire image data, and then the operation flow proceeds to the end (S946).

Figure 20:
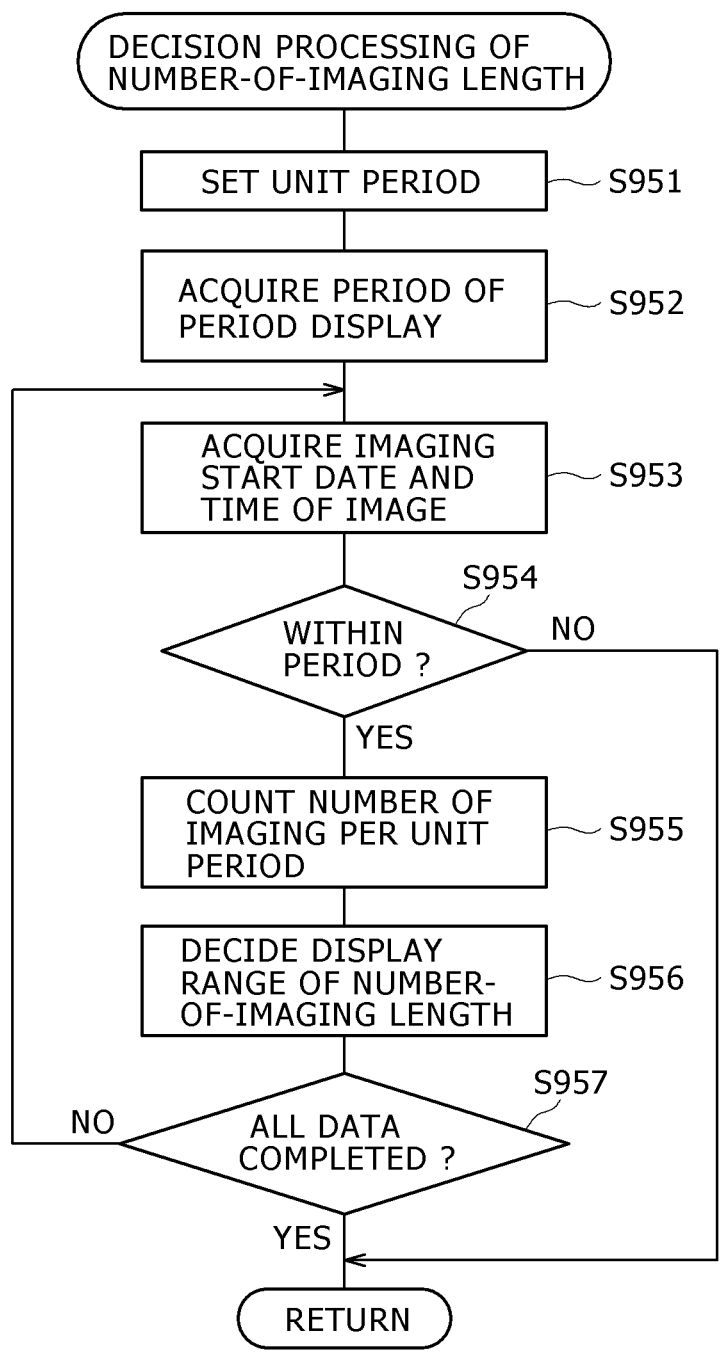
FIG. 20 is a diagram showing the decision flow of the display range of a number-of-imaging length display according to the embodiment.

FIG. 20 is a diagram showing the flow of decision of display ranges of number-of-imaging length displays. Initially a unit period is set (S951), and then information on the period of a period display is acquired (S952). The unit period may be set to one day, or alternatively may be set to one hour, for example. Subsequently, the imaging start date and time of image data is acquired (S953). A determination is then made as to whether or not the imaging start date and time of the image data is included in the period of the period display (S954). As for the image data of which imaging start date and time is not included in the period of the period display, no subsequent processing is executed and the operation flow proceeds to the end.

The image data of which imaging start date and time is included in the period of the period display is sorted based on the set unit period. Subsequently, the number of imaging times in each of the unit periods is counted (S955). Specifically, when the period of the period display is from the 1 Jan. 2005 to the 15 Jan. 2005 and the unit period is set to one day for example, the number of imaging times is counted for each day in the period from the 1 Jan. 2005 to the 15 Jan. 2005.

Based on the numbers of imaging times per unit period counted in the step S955, the display ranges of number-of-imaging length displays are decided (S956). This decision is carried out based on the ratios of the respective numbers of imaging times per unit period to the maximum number of the numbers counted in the step S955 for example. The steps S953 to S956 are repeated for the entire image data, and then the operation flow proceeds to the end (S957).

The embodiment of the invention is merely an example for embodying the invention. Although the components in the embodiment have the following correspondence to invention-specifying elements set forth in claims, the invention is not limited to the components but may be modified variously without departing from the spirit and scope of the invention.

Specifically, in a claim , the imaging date-and-time acquiring means corresponds to e.g. the imaging information acquiring section 201. In addition, the imaging position deciding means corresponds to e.g. the imaging start position deciding section 203 and the imaging time length deciding section 205. Furthermore, the imaging position display creating means corresponds to e.g. the imaging position display creating section 208.

In a claim, the period setting means corresponds to e.g. the period setting part 204.

In a claim, the effect display adding means corresponds to e.g. the effect display adding section 211.

In a claim, the recorded volume acquiring means corresponds to e.g. the imaging information acquiring section 201. Furthermore, the recorded volume length deciding means corresponds to e.g. the recorded volume length deciding section 206.

In a claim, the operating means corresponds to e.g. the operating part 301. The selective area determining means corresponds to e.g. the selective area determining section 302. The thumbnail retaining means corresponds to e.g. the thumbnail retaining section 305. The thumbnail extracting means corresponds to e.g. the thumbnail extracting section 304.

In a claim, the selected area display creating means corresponds to e.g. the selected area display creating section 307.

In a claim, the operating means corresponds to e.g. the operating part 212. Furthermore, the period reduction setting means corresponds to e.g. the period reduction setting part 213.

In a claim, the imaging date-and-time acquiring means corresponds to e.g. the imaging information acquiring section 201. The imaging start date-and-time creating means corresponds to e.g. the index table 202. The imaging start position deciding means corresponds to e.g. the imaging start position deciding section 203. The imaging position display creating means corresponds to e.g. the imaging position display creating section 208.

In a claim, the imaging time length deciding means corresponds to e.g. the imaging time length deciding section 205.

In a claim, the recorded volume acquiring means corresponds to e.g. the imaging information acquiring section 201. The recorded volume length deciding means corresponds to e.g. the recorded volume length deciding section 206. The imaging position display creating means corresponds to e.g. the imaging position display creating section 208.

In a claim, the imaging date-and-time acquiring means corresponds to e.g. the imaging information acquiring section 201. The number-of-imaging length deciding means corresponds to e.g. the number-of-imaging length deciding section 207. The imaging frequency display creating means corresponds to e.g. the imaging frequency display creating section 210.

In a claim, the imaging date-and-time acquiring means corresponds to e.g. the imaging information acquiring section 201. In addition, the imaging position deciding means corresponds to e.g. the imaging start position deciding section 203 and the imaging time length deciding section 205. In addition, the imaging position display means corresponds to e.g. the imaging position display creating section 208 and the display part 42.

In a claim, the step of acquiring imaging date and time corresponds to e.g. the steps S911, S922 and S933. In addition, the step of deciding an imaging position corresponds to e.g. the steps S914, S915, S924 and S937. Furthermore, the step of creating an imaging position display corresponds to e.g. the step S916.

In a claim, the step of acquiring imaging date and time corresponds to e.g. the steps S911 and S933. The step of creating imaging start date and time corresponds to e.g. the step S922. The step of deciding a position corresponds to e.g. the steps S914 and S924. The step of creating an imaging position display corresponds to e.g. the step S916.

In a claim, the step of acquiring imaging date and time corresponds to e.g. the steps S911 and S953. The step of deciding a number-of-imaging length corresponds to e.g. the steps S915, S955 and S956. The step of creating an imaging frequency display corresponds to e.g. the step S916.

In a claim, the step of acquiring imaging date and time corresponds to e.g. the steps S911, S922 and S933. In addition, the step of deciding an imaging position corresponds to e.g. the steps S914, S915, S924 and S937. The step of creating an imaging position display corresponds to e.g. the step S916.

In a claim, the step of acquiring imaging date and time corresponds to e.g. the steps S911 and S933. The step of creating imaging start date and time corresponds to e.g. the step S922. The step of deciding an imaging start position corresponds to e.g. the steps S914 and S924. The step of creating an imaging position display corresponds to e.g. the step S916.

In a claim, the step of acquiring imaging date and time corresponds to e.g. the steps S911 and S953. The step of deciding a number-of-imaging length corresponds to e.g. the steps S915, S955 and S956. The step of creating an imaging frequency display corresponds to e.g. the step S916.

The processing procedures described in the embodiment of the present invention may be treated as a method including a series of these procedures. Alternatively, the processing procedures may be treated as a program for driving a computer to execute a series of these procedures, or a recording medium that stores the program.

It should be understood by those skilled in the art that various modifications, combinations, sub-combinations and alterations may occur depending on design requirements and other factors insofar as they are within the scope of the appended claims or the equivalents thereof.

The invention claimed is:

1. An image production device, comprising:
   an imaging date-and-time acquiring section to acquire an imaging date and time of a certain image from a recording medium;
   an imaging position deciding section to decide a position corresponding to the imaging date and time as an imaging position in a period display representing a certain period, wherein the certain period has a time length extending from a start date and time to an end date and time, and wherein the deciding of the imaging position is based on a difference between an imaging start date and time of the certain image and the start date and time of the certain period; and
   an imaging position display creating section to create an imaging position display in which the imaging position is superimposed on the period display, wherein the imaging position display creating section creates the imaging position display so that a display having a length corresponding to a recorded volume magnitude of the image is displayed as the imaging position, wherein the length corresponding to the recorded volume magnitude of the image is decided based on a largest recorded volume magnitude among recorded volume magnitudes respectively of a plurality of images to be displayed.

2. The image production device according to claim 1, further comprising:
   a period setting section to set the certain period.

3. The image production device according to claim 2, wherein
   the period setting section specifies the start date and time and the end date and time to thereby set the certain period.

4. The image production device according to claim 2, further comprising:
   an effect display adding section to add an effect display periodically associated with the period display in the period set by the period setting section.

5. The image production device according to claim 1, further comprising:
   a recorded volume acquiring section that acquires the recorded volume magnitude of the certain image from the recording medium; and
   a recorded volume length deciding section that decides the length corresponding to the recorded volume magnitude of the image, wherein
   the imaging position display creating section creates the imaging position display in which the length corresponding to the recorded volume magnitude of the image is further superimposed on the imaging position.

6. The image production device according to claim 5, wherein
   the recorded volume length deciding section decides the length corresponding to the recorded volume magnitude of the image based on a ratio of the recorded volume of the image to the largest recorded volume magnitude of the recorded volume magnitudes respectively of the plurality of images of which imaging position is to be displayed.

7. The image production device according to claim 1, further comprising:
   an operating section to select any point in the period display;
   a selective area determining section to determine an area corresponding to the selected point;
   a thumbnail retaining section to retain a thumbnail of the image; and
   a thumbnail extracting section to extract the thumbnail corresponding to the area from the thumbnail retaining section.

8. The image production device according to claim 7, further comprising:
   a selected area display creating section to create a selected area display representing a selected area in the period display, the selected area being the area corresponding to the selected point.

9. The image production device according to claim 1, further comprising:
   an operating section to select a certain part in the imaging position display; and
   a period reduction setting section to set a reduced period of the period display in the imaging position display for a period setting section that sets the certain period, the reduced period including a date and time corresponding to the selected certain part and shorter than the certain period before the selection of the certain part.

10. A display device, comprising:
an imaging date-and-time acquiring section to acquire an imaging date and time of a certain image from a recording medium;
an imaging position deciding section to decide a position corresponding to the imaging date and time as an imaging position in a period display representing a certain period, wherein the certain period has a time length extending from a start date and time to an end date and time, and wherein the deciding of the imaging position is based on a difference between an imaging start date and time of the certain image and the start date and time of the certain period; and
an imaging position displaying section to display the period display and the imaging position so that the imaging position is superimposed on the period display, wherein the imaging position display creating section creates the imaging position display so that a display having a length corresponding to a recorded volume magnitude of the image is displayed as the imaging position, wherein the length corresponding to the recorded volume magnitude of the image is decided based on a largest recorded volume magnitude among recorded volume magnitudes respectively of a plurality of images to be displayed.

11. An image production method, comprising:
acquiring an imaging date and time of a certain image from a recording medium;
deciding a position corresponding to the imaging date and time as an imaging position in a period display representing a certain period, wherein the certain period has a time length extending from a start date and time to an end date and time, and wherein the deciding of the imaging position is based on a difference between an imaging start date and time of the certain image and the start date and time of the certain period; and
creating an imaging position display in which the imaging position is superimposed on the period display, wherein the imaging position display is created so that a display having a length corresponding to a recorded volume magnitude of the image is displayed as the imaging position, wherein the length corresponding to a recorded volume magnitude of the image is decided based on a largest recorded volume magnitude among recorded volume magnitudes respectively of a plurality of images to be displayed.

12. A program on a non-transitory recording medium and readable from the non-transitory medium by a computer to execute an image production process, the process comprising:
acquiring an imaging date and time of a certain image from a recording medium;
deciding a position corresponding to the imaging date and time as an imaging position in a period display representing a certain period, wherein the certain period has a time length extending from a start date and time to an end date and time, and wherein the deciding of the imaging position is based on a difference between an imaging start date and time of the certain image and the start date and time of the certain period; and
creating an imaging position display in which the imaging position is superimposed on the period display, wherein the imaging position display is created so that a display having a length corresponding to a recorded volume magnitude of the image is displayed as the imaging position, wherein the length corresponding to the recorded volume magnitude of the image is decided based on a largest recorded volume magnitude among recorded volume magnitudes respectively of a plurality of images to be displayed.

13. An image production device, comprising:
imaging date-and-time acquiring means for acquiring an imaging date and time of a certain image from a recording medium;
imaging position deciding means for deciding a position corresponding to the imaging date and time as an imaging position in a period display representing a certain period, wherein the certain period has a time length extending from a start date and time to an end date and time, and wherein the deciding of the imaging position is based on a difference between an imaging start date and time of the certain image and the start date and time of the certain period; and
imaging position display creating means for creating an imaging position display in which the imaging position is superimposed on the period display, wherein the imaging position display creating means creates the imaging position display so that a display having a length corresponding to a recorded volume magnitude of the image is displayed as the imaging position, wherein the length corresponding to the recorded volume magnitude of the image is decided based on a largest recorded volume magnitude among recorded volume magnitudes respectively of a plurality of images to be displayed.

14. A display device, comprising:
imaging date-and-time acquiring means for acquiring an imaging date and time of a certain image from a recording medium;
imaging position deciding means for deciding a position corresponding to the imaging date and time as an imaging position in a period display representing a certain period, wherein the certain period has a time length extending from a start date and time to an end date and time, and wherein the deciding of the imaging position is based on a difference between an imaging start date and time of the certain image and the start date and time of the certain period; and
imaging position display means for displaying the period display and the imaging position so that the imaging position is superimposed on the period display, wherein the imaging position display means creates the imaging position display so that a display having a length corresponding to a recorded volume magnitude of the image is displayed as the imaging position, wherein the length corresponding to the recorded volume magnitude of the image is decided based on a largest recorded volume magnitude among recorded volume magnitudes respectively of a plurality of images to be displayed.

* * * * *